United States Patent [19]

Ranganathan et al.

[11] Patent Number: 5,604,821
[45] Date of Patent: Feb. 18, 1997

[54] STRUCTURE AND METHOD FOR DYNAMIC SCENE ANALYSIS

[75] Inventors: N. Ranganathan, Tampa, Fla.; Rajiv Mehrotra, Lexington, Ky.

[73] Assignee: The University of South Florida, Tampa, Fla.

[21] Appl. No.: 324,383

[22] Filed: Oct. 17, 1994

Related U.S. Application Data

[63] Continuation of Ser. No. 842,985, Feb. 28, 1992, abandoned.

[51] Int. Cl.$^6$ ........................................ G06K 9/36
[52] U.S. Cl. .................... 382/236; 382/303; 382/308; 348/407
[58] Field of Search .............................. 382/41, 48, 49, 382/56, 276, 302–304, 308; 348/407

[56] References Cited

U.S. PATENT DOCUMENTS

| | | | |
|---|---|---|---|
| 4,433,438 | 2/1982 | Courturier | 382/41 |
| 4,464,789 | 8/1984 | Sternberg | 382/48 |
| 4,553,260 | 11/1985 | Belt et al. | 382/22 |
| 4,570,180 | 2/1986 | Baier et al. | 358/106 |
| 4,601,055 | 7/1986 | Kent | 382/49 |
| 4,698,751 | 10/1987 | Parvin | 364/200 |
| 4,825,388 | 4/1989 | Dailey | 364/518 |
| 4,847,772 | 7/1989 | Michalopoulos et al. | 364/436 |
| 4,853,970 | 8/1989 | Ott et al. | 382/54 |
| 4,942,533 | 7/1990 | Kakinami et al. | 364/449 |
| 5,019,901 | 5/1991 | Uomori et al. | 358/105 |
| 5,032,903 | 7/1991 | Suzuki et al. | 358/75 |
| 5,034,811 | 7/1991 | Palm | 358/105 |
| 5,083,201 | 1/1992 | Ohba | 358/105 |
| 5,099,324 | 3/1992 | Abe | 558/108 |

OTHER PUBLICATIONS

"A VLSI System for Difference Picture–based Motion Analysis" by N. Ranganathan and R. Mehrotra, published Oct., 1989, in *Tools for Artificial Intelligence* pp. 592–598.

"A VLSI Architecture for Difference Picture–Based Dynamic Scene Analysis" by N. Ranganathan and R. Mehrotra, published Jun., 1990, by IEEE Computer Society Press pp. 506–508.

"VLSI Algorithms and Architectures for Connected Components Labeling" by Suresh Subramanian, dated on or about Apr. 1, 1990 pp. 1–67.

"Evaluating the Performance of Multicomputer Configurations" by Dharma P. Agrawal and Virendra K. Janakiram published May, 1986 pp. 23–37.

"Extraction of Motion Information from Peripheral Processes" by Ramesh Jain, published Sep., 1981 pp. 489–503.

(List continued on next page.)

*Primary Examiner*—Leo Boudreau
*Assistant Examiner*—Chris Kelley
*Attorney, Agent, or Firm*—Calfee, Halter & Griswold

[57] ABSTRACT

Circuit architecture for dynamic scene analysis uses a difference picture based technique wherein pixel values corresponding to the same position from previous and current frames are inputted to the system during each clock cycle. The difference picture is input to a connected component labeling algorithm in order to obtain the various connected components in the difference picture. A Sobel edge detector is applied to previous and current frame pixel values, and the resulting data stored in a buffer so that for each pixel, the connected component label of the difference picture, the Sobel edge value in the current frame, and the Sobel edge value in the previous frame are stored. The buffer supplies the data to a series of motion detection processors which are arranged in a systolic array. An alternative arrangement is to arrange the motion detection processors in parallel in a pipeline fashion with no feedback logic. In any case, each processor analyzes a different region of the difference picture in order to detect and classify the type of motion occurring in that region. The difference picture generator, Sobel operators, connected components hardware and buffer, and motion detection processors can be implemented into a CMOS VLSI chip to obtain high speed and real time response.

25 Claims, 11 Drawing Sheets

OTHER PUBLICATIONS

"Cytocomputer Real–Time Pattern Recognition" by Stanley R. Sternberg p. 205 Environmental Research institute of Michigan, published in 1978.

"Dynamic Scene Analysis Using Pixel–Based Processes" by Ramesch Jain, Intelligent Systems Laboratory, Wayne State University, published in Aug., 1981 pp. 12–18.

"Design of an Image Edge Detection Filter Using the Sobel Operator" pp. 358–366 by Nick Kanopoulos and Robert L. Baker, IEEE publication, published in Apr., 1988.

"Design of Fast Connected Components Hardware" by Xue Dong Yang, Robotics Research Laboratory New York University, IEEE publication, published in Apr., 1988 pp. 937–944.

| x | y | b | a | p | q | r | LABEL |
|---|---|---|---|---|---|---|-------|
| 0 | 0 | 0 | 0 | 0 | 0 | 0 | 0 |
| 0 | 0 | 1 | 1 | 0 | 0 | 0 | 0 |
| 1 | 0 | 0 | 0 | 0 | 0 | 1 | 1 |
| 1 | 0 | 0 | 1 | 0 | 0 | 1 | 1 |
| 1 | 0 | 1 | 0 | 0 | 0 | 1 | 1 |
| 1 | 0 | 1 | 1 | 0 | 0 | 1 | 1 |
| 1 | 1 | 0 | 0 | 0 | 1 | 0 | 2 |
| 1 | 1 | 0 | 1 | 0 | 1 | 1 | 3 |
| 1 | 1 | 1 | 0 | 1 | 0 | 0 | 4 |
| 1 | 1 | 1 | 1 | 1 | 0 | 1 | 5 |

$p = x.y.b$
$q = x.y.\bar{b}$
$r = x.(a + \bar{y})$

1

STRUCTURE AND METHOD FOR DYNAMIC SCENE ANALYSIS

This is a continuation of application Ser. No. 07/842,985 filed on Feb. 28, 1992, now abandoned.

BACKGROUND

Analysis of dynamic scenes to obtain motion parameters, structures and identities of the objects present in the scene, and/or description of the events taking place in the scene, is an important problem in machine vision. Dynamic scene analysis involves processing and analysis of a sequence of image frames (snapshots of a scene) taken at a regularly spaced time interval. Since a large volume of data is generally required to be processed, dynamic scene analysis techniques are, in general, computationally very intensive which makes them unsuitable for applications that require real-time response.

One type of dynamic scene analysis using the difference picture-based technique has been proposed by Jain (See R. Jain, "Extraction of Motion Information from Peripheral Processes," *IEEE Transactions on Pattern Analysis and Machine Intelligence*, Vol. PAMI-3, No. 5, 1981, pp 489–543; and R. Jain, "Dynamic Scene Analysis Using Pixel-Based Processes," *Computer*, August 1981, pp. 12–18). Jain's approach provides that for the two image frames, f1 and f2, the difference picture is a binary picture generated using the following definition:

$$D_{f1,f2}(i,j)=1 \text{ if } |f1(i,j)-f2(i,j)|>=T \text{ (a pre-defined threshold)}=0 \text{ otherwise.}$$

In other words, the difference picture $D_{f1,f2}(f_i, f_j)$ is a binary comparison of two image frames, $f_i$ and $f_j$ generated by placing a 1 in each position where the corresponding pixels in $f_i$ and $f_j$ have appreciable different gray level characteristics. If the gray levels of the corresponding pixels in the frames under comparison differ by more than a predetermined threshold, then the pixels are considered to be different. The value of the threshold is scene dependent.

To analyze a dynamic scene, the difference picture is generated for two image frames of the scene taken at contiguous time instants. The first frame is called the "previous" frame while the second frame is called the "current" frame. The entries in the difference pictures are assumed to be caused by motion in the scene. To reduce the influence of noise, it is usually assumed that in difference pictures, connected regions of size less than some threshold are due to noise and are ignored by the use of a size filter. This may result in ignoring regions containing slow-moving and/or small objects, but it ensures that the remaining regions in the difference picture are the result of motion. According to Jain's approach, motion related information about dynamic objects in a scene can be obtained by analyzing the characteristics of the connected regions in the corresponding difference picture.

According to Jain, a difference picture region is a set of 4 connected (or 8 connected) non-zero difference picture pixels. A non-zero pixel in the difference picture is considered an edge point if at least one of its neighbors is zero. A pixel in a previous or current frame is considered an edge point if the value of the Sobel operator at that point in the frame is above a threshold.

A previous frame edge picture is a binary picture having a 1 entry in those positions which correspond to edge points in the difference picture and in the previous frame. Similarly, a current frame edge picture has 1 entries in those pixel positions which are edge points in the difference picture and the current frame.

A labeled difference picture is a picture in which a nonedge point of the difference picture is marked 1 and an edge point of the difference picture is marked 2, 3, 4, or 5 if the corresponding points in neither previous nor current, previous, current or both previous and current frames are edge points, respectively. The edge points in the difference picture usually form a closed arc. This arc is called an edge segment in the difference picture. An edge segment can usually be partitioned into several arcs such that each arc comprises entirely previous frame or current frame edge points. Each such partition is called a fragment. The partition comprising previous frame edge points is called the previous frame fragment, while the partition comprising current frame edge points is called the current frame fragment. In a labeled difference picture, a previous frame edge fragment comprises points labeled 3 or 5, while the current frame edge fragment comprises points labeled 4 or 5.

The overall analysis requires computation of the following features for each region of the difference picture:

(1) $N_c$, the number of fragments of difference picture edge points that are also edge points in the current frame. Such a fragment is called a current-frame edge fragment.

(2) $N_p$, the number of fragments of difference picture edge points that are also edge points in the previous frame. Such a fragment is called a previous-frame edge fragment.

(3) $C_c$, a Boolean value representing the closedness of the current-frame edge fragment. It is true when the current-frame edge fragment is closed and false otherwise.

(4) $C_p$, a Boolean value representing the closedness of the previous frame edge fragment. It is true when the previous-frame edge fragment is closed and false otherwise.

(5) CURPRE, the ratio of current-frame edge points to previous-frame edge points of the region.

Based on these features, a region of the difference picture can be classified into one of the nine classes using a decision tree as shown in FIG. 1.

Where:
O=Covering of background by a moving object
B=Uncovering of background by a moving object
OC=Occlusion
TSO=Translation of one moving object
APP=Approaching object
REC=Receeding object
PFP=Previous frame position of a totally displaced object
CFP=Current frame position of a totally displaced object
X=Uncertain Eight of these classes correspond to different motion situations. It should be noted that this is a peripheral phase technique.

Two different implementation strategies are known which improve the efficiency of Jain's approach. Agrawal and Jain have proposed a pseudo-parallel system architecture to implement Jain's difference picture based motion detection technique (See, D. P. Agrawal and R. Jain, "A Pipelined Pseudo-parallel System Architecture for real-time Dynamic Scene Analysis," *IEEE Transactions. on Computers*, Vol. C-31, No. 10, October 1982, pp. 952–962). The Agrawal and Jain approach involves 41 processors (CPU's or microprocessors) for the peripheral phase computing in Single Instruction Multiple Data (SIMD), Multiple Instruction Multiple Data (MIMD), and Single Instruction Single Data (SISD) modes which requires a large number of memory modules (roughly 150), with the size of modules varying from 1K to 14K words. Their system also requires a distributed operating system and involves tackling problems like task partitioning, assignment of memory modules and processors to the partitioned tasks, use of complex multi-stage interconnection networks, and on the whole a very complex control system potentially requiring several hundred VLSI chips.

The Agrawal and Jain approach overcomes some of the shortcomings of complex vision tasks that are not inherently parallel in nature. However, their approach is not without drawbacks. For example, the approach is uneconomic since the architecture requires enormous amount of hardware as described above. Additionally, the proposed system can be inefficient in terms of speed due to the large number of memory accesses and also the different levels of compilations and requirement of periodic interferences of the operating system.

Agrawal et al. have proposed the use of a multi-computer system where a multiple number of independent computers connected loosely via a communication network can be used for dynamic scene analysis (See D. P. Agrawal, V. K. Janakiram and G. C. Pathak, "Evaluating Performance of Multicomputer Configurations," *Computer*, Vol. 19, No. 5, May 1986, pp. 23–37). The Agrawal et al. approach considers various parallel architectures like Alpha network, mesh, hyper tree, fully connected network, cube and multi-tree structures and provides a performance comparison to study the suitability of these networks for dynamic scene analysis. However, this approach suffers from some of the same drawbacks described previously. For example, the Agrawal, et al. approach uses parallel medium-power processors arranged in close proximity which communicate via dedicated links or communication paths. These processors can be expensive and may not be able to obtain enough speed up in dynamic scene analysis computation to justify their use.

SUMMARY

The present invention provides an architecture for a difference picture-based dynamic scene analysis technique that can perform analysis in real time and is simple to implement. The architecture exploits the parallelism and pipelining possible in the difference picture-based dynamic scene technique so that the use of parallel machines which have high overheads is not necessary. The architecture is simple enough that it can be implemented on a single VLSI chip.

The architecture for the dynamic scene analysis consists of a difference picture generator which takes as inputs pixel values corresponding to the same location in the scene from previous and current time frames. The difference picture generator provides as output the difference picture of the scene. The difference picture of the scene is applied to connected components hardware which provides as output the connected components labels of the difference picture.

The connected component labels as well as the edge values of the previous and current frames (from Sobel edge detectors) are applied through a buffer to a plurality of motion detection processors. The motion detection processors are simple processors arranged in a linear systolic array. An alternative arrangement is to arrange the processors in parallel in a pipeline fashion without feedback. In any case, each processor analyzes a different region of the difference picture in order to detect and classify the type of motion occurring in that region.

Each motion detection processor module has a region selector stage which selects and retains a single connected component from the difference picture. The region selector produces a binary image which corresponds to a specific connected component in the difference picture. The binary image is then input to difference picture edge detector stage which outputs only the corresponding binary image representing the edges of the particular connected component. These edge values along with the corresponding Sobel edge information are input to a labeled picture generator stage.

The labeled picture generator assigns a label to each pixel depending on the input data corresponding to that pixel. In essence, the labeling is done depending on whether the pixels are edge points in the previous and current frames and the difference picture. The labels are subsequently input to a feature extractor stage for feature extraction.

The feature extractor extracts the motion parameters from these labels. These parameters are used to detect the type of motion that occurred in the scene between the previous and current frames. Finally, a region classifier stage classifies the region to represent the characteristic of the motion observed within the selected region.

The motion computation for the various regions by the motion detection processors are independent of each other, and several regions of the difference picture can be analyzed in parallel. The architecture is simple enough that the motion detection and classification system can be implemented within a single VLSI chip. By implementing the analysis technique using VLSI technology, high speed and real time response can be achieved.

Accordingly, it is one object of the present invention to provide a motion detection and classification system for dynamic scene analysis which can be implemented on a single chip.

It is another object of the present invention to provide a system which can perform dynamic scene analysis in real time and which can be implemented using VLSI architecture.

Another object of the present invention is to provide a system which does not involve the design of a special operating system and which can be interfaced as a backend subsystem to a host microprocessor.

Further objects of the present invention will become apparent from the following detailed description and accompanying drawings which form a part of the specification.

DETAILED DESCRIPTION OF THE PREFERRED EMBODIMENT

Figure 2A:
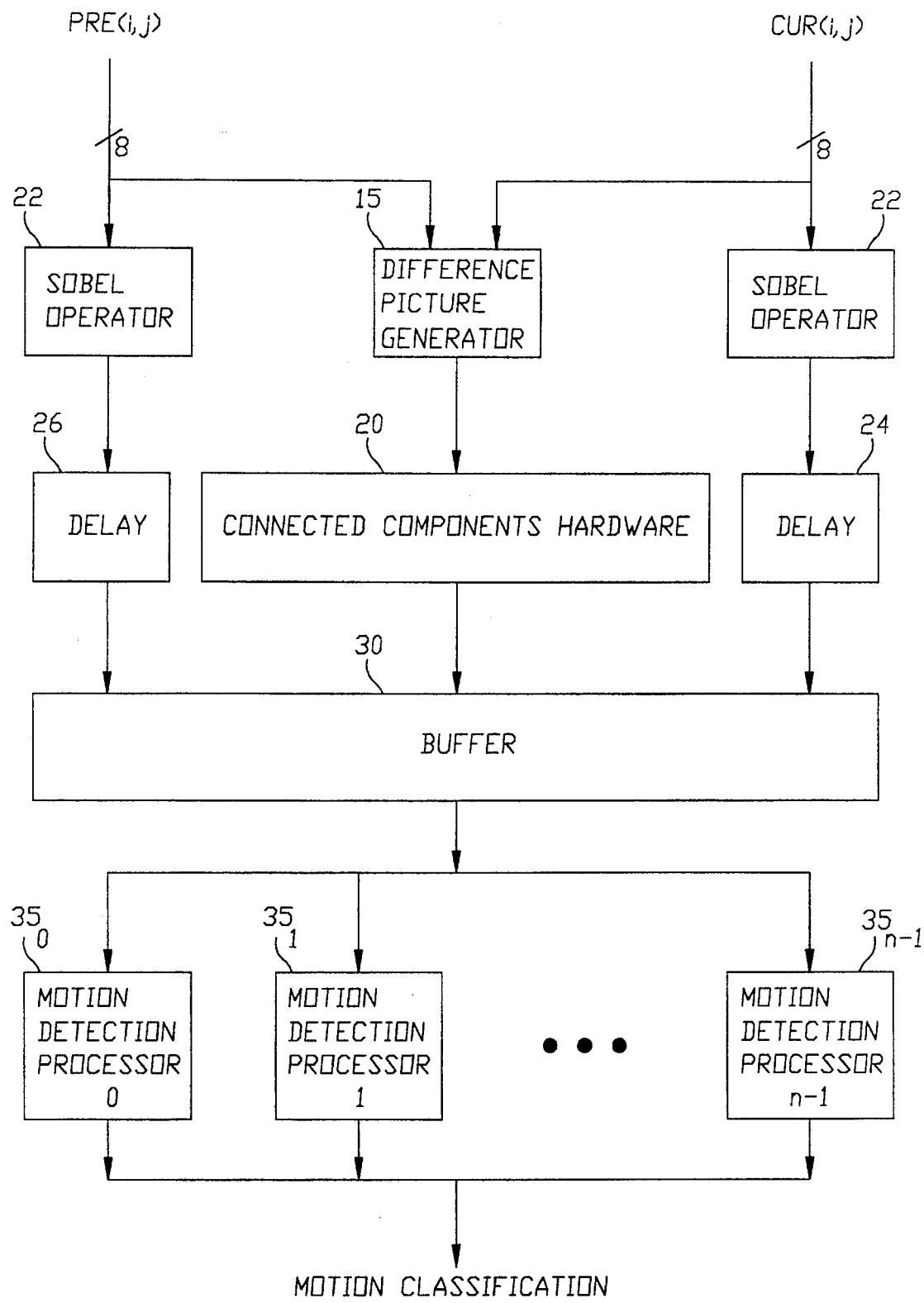
FIG. 2A is a schematic illustration of the architecture for the dynamic scene analysis system of the present invention showing the motion detection processor modules arranged in parallel with global broadcast.

The architecture of the present invention showing the various stages of computation in the difference picture-based technique is given schematically in FIG. 2A. The pixel (picture element) values corresponding to the same position (i,j) from the previous and current frames are input from a camera or other remote device (not shown) to the system during each clock cycle.

The difference picture is provided by a difference picture generator 15. In essence, the difference picture generator compares the image frames of a scene at contiguous time instances. Eight bit values representing the grey-level intensity of the pixels from the previous frame and current frames are received in respective registers in a raster scan sequence from left to right within a line, and lines from top to bottom. The values from the registers are compared using a subtractor and a "1" is placed in each position where the corresponding pixels in the two frames have appreciably different grey-level characteristics (i.e., where the different grey-level characteristics are above some threshold value).

The operation of the difference picture generator is described in detail in R. Jain, "Extraction of Motion Information from Peripheral Processes," *IEEE Transactions on Pattern Analysis and Machine Intelligence*, Vol. PAMI-3, No. 5, 1981, pp 489–543; and R. Jain, "Dynamic Scene Analysis Using Pixel-Based Processes," *Computer*, August 1981, pp. 12–18. There are several different methods for generating the difference picture which should be known to those skilled in the art.

The difference picture is input to connected component labeling hardware 20 in order to obtained the various connected components in the difference picture. The connected component labeling hardware segments the difference picture into different regions depending on the various types of motion in each region. Additionally, Sobel edge detectors 22 are applied to previous and current frame pixel values. The edge values from the Sobel edge detectors are single bit binary data.

There are different types of connected component algorithms which can be used with the connected component labeling hardware 20 to provide the segmenting (i.e., the "connected components"). Some algorithms take a binary picture and produce labeled lists of connected features abstract from the image structure. Other algorithms take a binary image and label each connected "blob" while retaining the image data structure. The labeling of the connected components in the difference picture preferably uses an algorithm of the latter type. Each pixel from the connected components hardware has a label that represents a connected component in the difference picture.

The hardware architecture for the connected component labeling architecture preferably includes 'N' processing elements (PE's) arranged in a systolic array using bit-wise comparator logic. The hardware includes comparators, multiplexers and registers, and processes the image two rows of pixels at a time and makes two passes over the image. The first pass processes the image from top to bottom, while the second pass processes the output from the first pass from bottom to top. During the processing of any row, each of the N PE's contain two pixels. One pixel is from the row being processed. The other pixel for Pass 1 is the one directly above it and for Pass 2 is the one directly below it. Thus, during the processing of row r, $PE_i$ contains pixels $P_{r,i}$ and $P_{r-1,i}$ during Pass 1 and pixels $P_{r,i}$ and $P_{r+1,i}$ during Pass 2, where r and i are respectively the row and column indices.

Each PE can determine the label values of the pixels stored in the adjacent PE's. Label equivalents established at a PE during processing (this occurs when two previously unconnected components merge at the pixel) is stored locally within the PE itself. This equivalence of labels is transmitted to the other pixels in the row by shifting them left through the linear array of PE's. See e.g., X. D. Yang, "Design of Fast Connected Component Hardware," *Proceedings of CVPR*, June 1988, pp. 937–944; and N. Ranganathan, R. Mehrotra and S. Subramaniam, "A Systolic Algorithm and Architecture for Connected Component Labeling," Proceedings of the Third IEEE Symposium on Parallel and Distributed Processing, December 1991, pp. 818–825, a copy of which is attached hereto as Exhibit A and is made part of this disclosure.

The hardware architecture for the Sobel operators preferably includes a 3×3 linear convolver and Sobel post processor chips. However, there are several hardware architectures for implementing the Sobel operator for the Sobel edge detectors. See e.g., N. Kanopoulos, N. Vasanthavada, and R. L. Baker, "Design of an Image Edge Detection Filter Using the Sobel Operator," *IEEE Journal of Solid State Circuits*, Vol. 23, No. 2, April 1988; and S. R. Sternberg, Cytocomputer Real-Time Pattern Recognition, paper presented at the 8th Pattern Recognition Symposium, National Bureau of Standards, 1978, which to the extent necessary are also incorporated herein by reference.

The above data from the connected components algorithm and the Sobel edge detectors is stored in a buffer 30 in the following manner for each pixel: (1) the connected component label of the difference picture, (2) the Sobel edge value in current frame (through delay 24), and (3) the Sobel edge value in the previous frame (through delay 26).

The above stored information is then used by motion detection processors, for example as indicated at $35_o - 35_{n-1}$ (where n is the number of connected components), to detect the type of motion occurring in the scene and classify the motion accordingly. The various stages of computation in one of the motion detection processor modules is given in FIG. 3.

Each motion detection processor module has a region selector 40 which selects and retains a single connected component from the difference picture. The region selector 40 produces a binary image where a '1' in the binary image corresponds to a specific connected component in the difference picture, while the background pixels as well as the pixels corresponding to the other components will have a value of '0'. The selected component is called a "region" of the difference picture that will be analyzed for motion characteristics. The binary image is then input to difference picture edge detector hardware 42 which outputs only the corresponding binary image representing the edges of the particular connected component. These edge values along with the corresponding Sobel edge information (through synchronizing delay 44) are input to a labeled picture generator 46.

The labeled picture generator 46 assigns a 3-bit label to each pixel depending on the input data corresponding to that pixel. The details of the labeling procedure will be described herein in more detail. In essence, the labeling is done depending on whether the pixels are edge points in the previous and current frames and the difference picture. The labels are subsequently input to the feature extractor 48 for feature extraction. The feature extractor 48 extracts the motion parameters such as $N_p$, $N_c$, $C_p$, $C_c$, CURCNT and PRECNT from these labels. These parameters are used to detect the type of motion that occurred in the scene between the previous and current frames.

Finally, the region classifier 50 classifies the region to represent the characteristic of the motion observed within the selected region. Since the motion computation for various regions are independent of each other, several regions of the difference picture can be analyzed in parallel. Hence, parallel hardware for motion detection and classification are used.

Figure 2B:
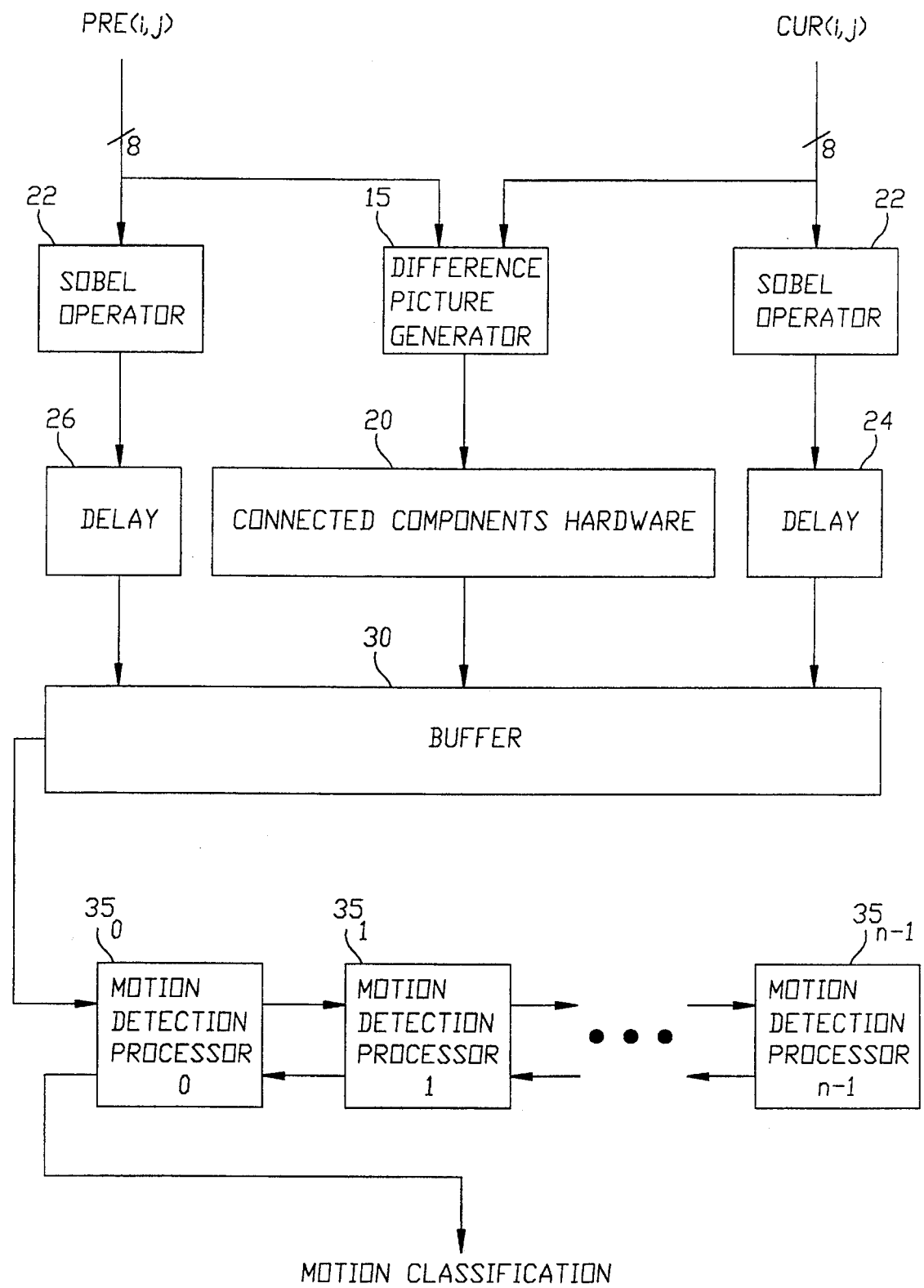
FIG. 2B is a schematic illustration of the architecture for the dynamic scene analysis system of FIG. 2A showing the motion detection processor module arranged as a linear systolic pipeline.

FIG. 2A illustrates the motion detection processor modules arranged in parallel, which requires global broadcast signals. The processor modules are synchronized with 35 ns clock cycles (with no feedback) to simultaneously analyze the separate regions of the difference picture. It is preferred, however, that the modules be arranged in a systolic array, as illustrated in FIG. 2B. The term "systolic" is used to indicate that the processors are connected in a pipeline fashion, with each processor connected only to an immediately adjacent processor. The data is inputted into the end processor and passed on to an adjacent processor during each clock cycle. Each processor lags the previous processor by one cycle. The processors therefore have an initial start-up period determined by the clock speed and the number of processors as data is loaded systolically into the processors. A systolic system could be an array, a tree or a mesh. By arranging the processors in a systolic array, a higher computation throughput can be realized.

The various stages of a motion detection processor will now be described in more detail.

Region Selector

Figure 4:
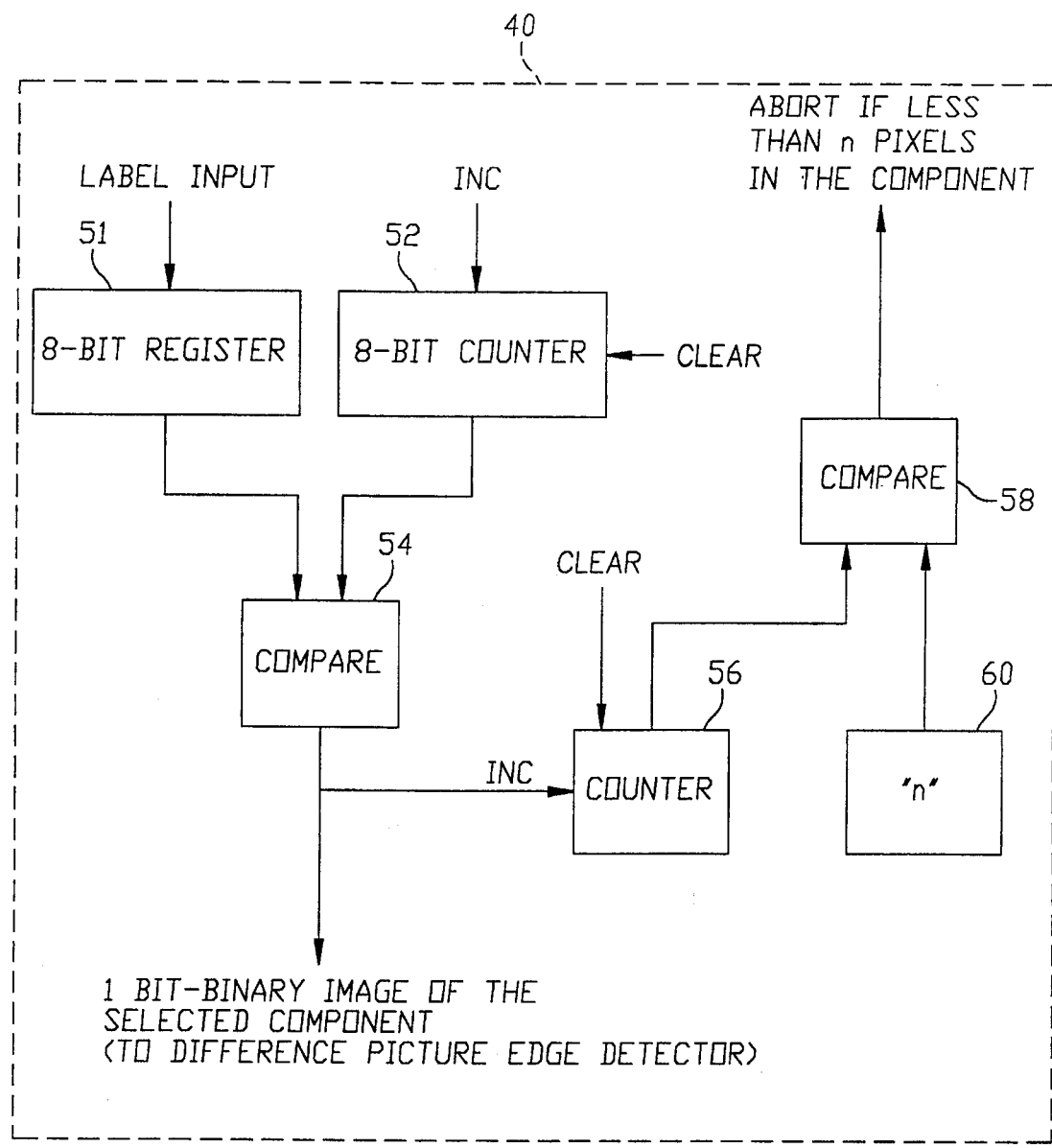
FIG. 4 is a schematic illustration of the hardware for the region selector for the motion detection processor module of FIG. 3.

Referring now to FIG. 4, the region selector 40 takes as input the output of the connected components hardware 20 from buffer 30 (FIG. 2A) and selects one component at a time. A connected component in the difference picture will be classified as a certain type region that will indicate the type of motion that occurred in that region.

The entire labeled image is input to an 8-bit register 51 in the region selector 40 at the rate of one pixel per clock cycle. It is assumed that the connected components are labeled in a serial manner, i.e., n components are labeled 1,2,3 . . . n. For implementation sake, it is assumed that the maximum number of connected components that can occur in the difference picture is 256 and so an 8-bit counter 52 is used which is initialized to '1' in the beginning. The input label is compared (at 54) with the contents of counter 52 which is incremented to contain the number of the connected component being analyzed. A '1' is output if a match occurs, and a '0' is output otherwise. Each time a '1' is output, a second counter 56 is incremented, which gives the number of pixels in the component in consideration.

After the entire image is scanned, the value of counter 56 is compared (at 58) with a predetermined number of components "N" (at 60). A connected component is analyzed for motion classification only if the connected component contains at least "N" pixels, or else the image is scanned for the next connected component. The value "N" can be defined to filter parts of the image that appeared in the difference picture due to noise.

Figure 3:
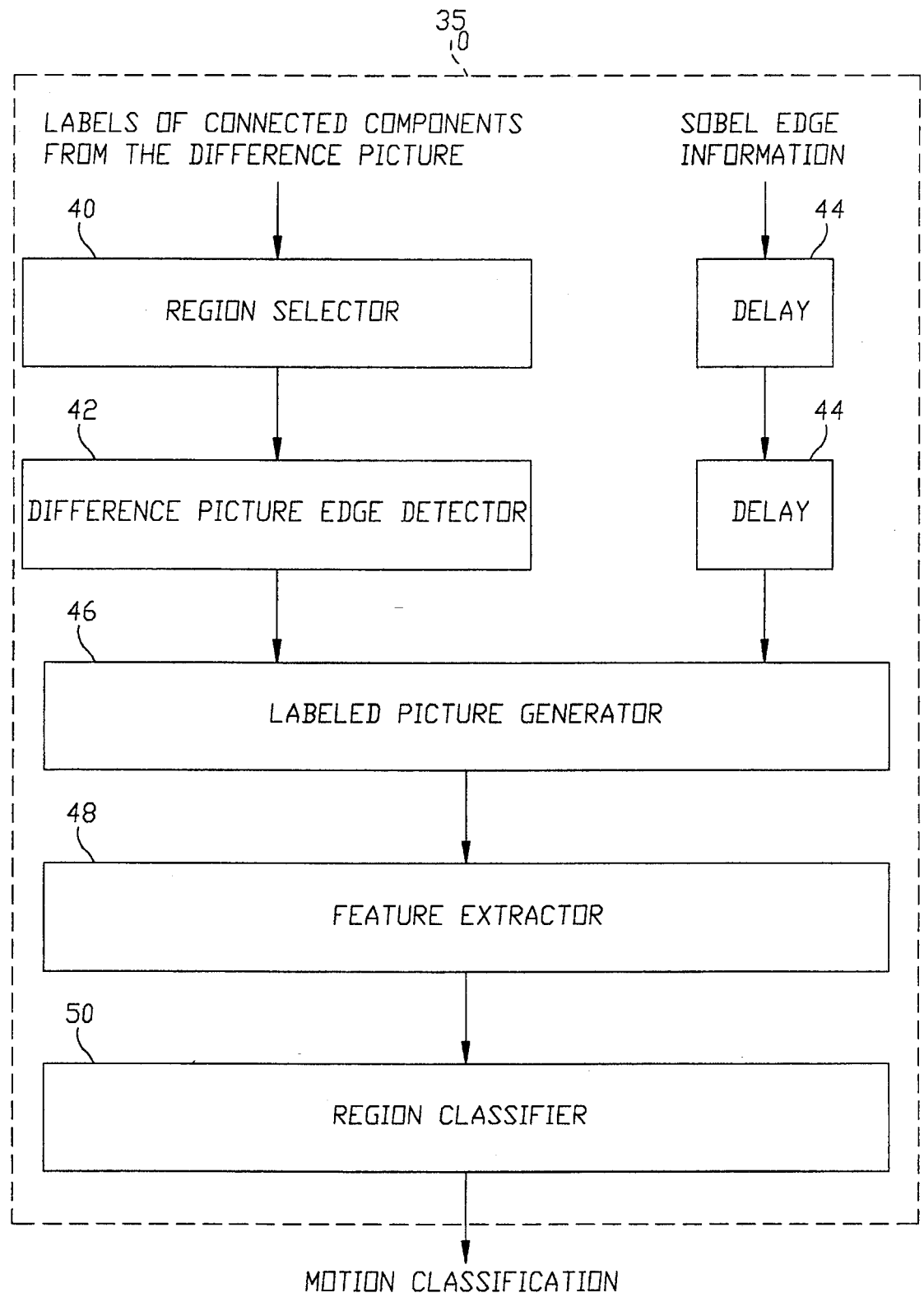
FIG. 3 is a schematic illustration of a motion detection processor module for the system of FIG. 2A.

At the same time, the previous and current frames (after applying the Sobel operator 22 (FIG. 2A)) reduce to binary images and these binary pixels are delayed for two clock cycles (at 44) for synchronization and passed on to the labeled picture generator 46 (FIG. 3).

Difference Picture Edge Detection

Figure 5A:
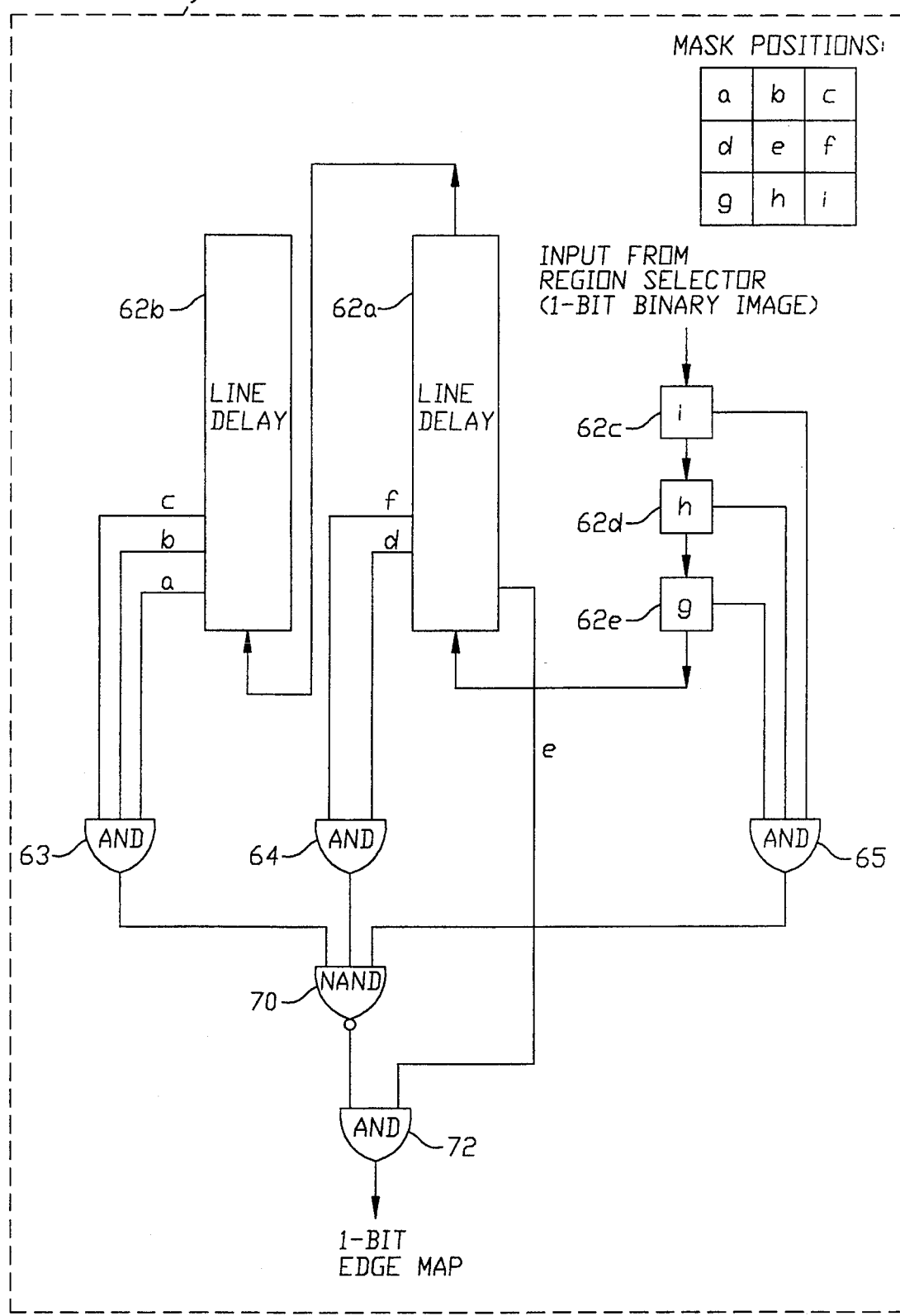
FIG. 5A is a schematic illustration of one type of hardware for the difference picture edge detection of FIG. 3.

As illustrated in FIG. 5A, the difference picture edge detector 42 includes a line delay FIFO buffer consisting of 2n+3 1-bit registers 62a, 62b, 62c, 62d, 62e, etc. (for row or line of size n) to obtain a 3×3 neighborhood (e.g., pixels a–i) for edge detection. A pixel with the value '1' is considered to be an edge point if any one of its eight neighbors is a '0' valued pixel. The pixel in consideration (e.g., pixel e) is an edge pixel if any one of its neighboring pixels is a background pixel (zero value). The pixels are 'AND'ed through gates 63, 64 and 65. For example, pixels a,b, c can be 'AND'ed through gate 64; and pixels g, h, i can be 'AND'ed through gate 65. The output from the gates 63, 64 and 65 are applied to NAND gate 70.

The output of the NAND gate 70 in FIG. 4 will be high if at least one of the neighboring pixels (a–d, f–i) has a zero value. This signal is again 'AND'ed through gate 72 with the pixel value in consideration which is done to ensure that the pixel in consideration is an object pixel (not a background pixel). The output of the circuit is '1' if the pixel being considered is an edge point and '0' otherwise.

Figure 5B:
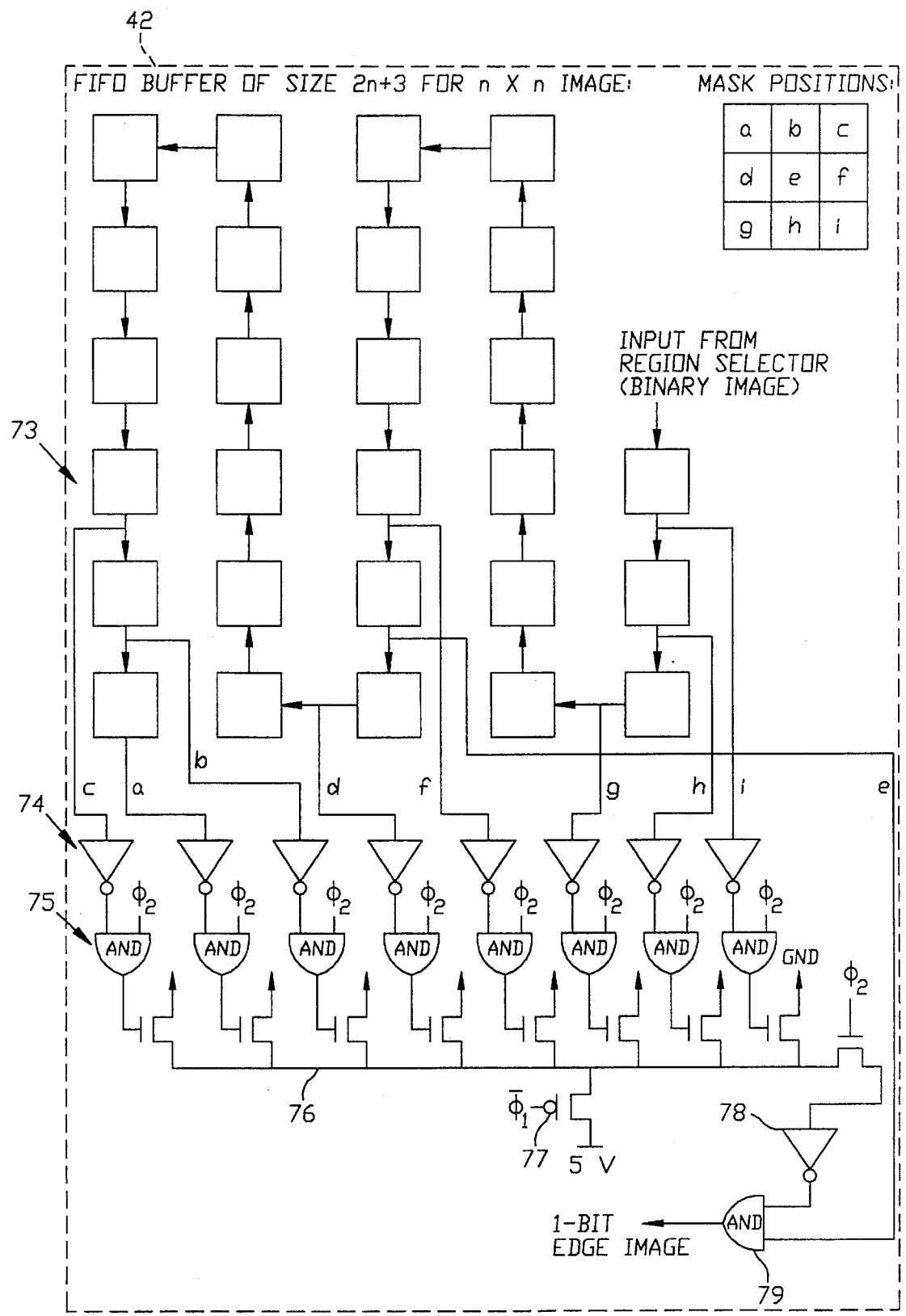
FIG. 5B is a schematic illustration of another type of hardware for the difference picture edge detection for the motion detection processor module of FIG. 3.

An alternative hardware design for the edge detector 42 is illustrated in FIG. 5B. This design uses precharge logic in order to speed up the computation. The design uses several one-bit registers, indicated generally at 73, to provide a 3×3 neighborhood for edge detection. Each neighborhood pixel is inverted (at 74) and 'AND'ed with phi2 phase of the clock (at 75) to generate a qualified signal. This ensures that the signal becomes active only during the phi2 phase. During the phi1 phase the output bus 76 is always precharged to '1' value. During the phi2 phase, if any of the neighborhood pixels is '0', a n-channel transistor 77 connecting the precharged bus 76 to the ground is activated. The bus value is inverted (at 78) and 'AND'ed (at 79) with the pixel value in consideration. The output of the circuit is '1' if the pixel being considered is an edge point and '0' otherwise.

Labeled Picture Generator

Figure 6:
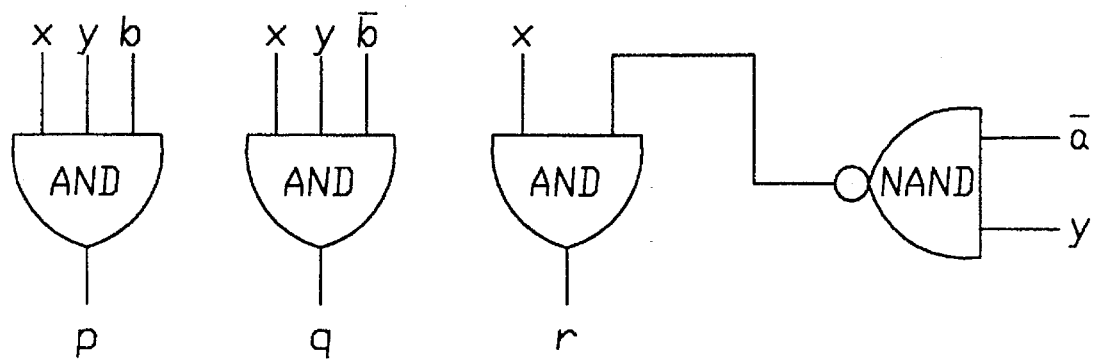
FIG. 6 is a schematic illustration of the hardware and logic for the labeled picture generator for the motion detection processor module of FIG. 3.

The logic for the labeled picture generator 46 is illustrated in FIG. 6.
Wherein:

Let x be the difference picture binary image pixel

Let y be the corresponding edge image pixel

Let a be the output of applying SOBEL on the corresponding pixel in the previous image (PRE(i,j))

Let b be the output of applying SOBEL on the corresponding pixel in the current image (CUR(i,j))

x, y, a, b are single bits

The labeled picture generator assigns labels between 0 and 5 for each pixel element. Each label will consist of 3 bits which we will call p, q and r, respectively. The labeled picture is obtained by applying the following algorithm to every pixel (i,j) of the difference picture DP, the current frame CUR, and the previous frame PRE:

```
If DP(i,j) = 1 then
if E(DP(i,j)) = 1 then { if DP(i,j) is an edge point }
    Begin
    DP(i,j) = 2;
    If Sobel(PRE(i,j)) = 1 then DP(i,j) = 3;
    If Sobel(CUR(i,j)) = 1 then DP(i,j) = DP(i,j) + 2;
    End;
```

Here E(DP(i,j)) is 1, if DP(i,j) is an edge point. It is 0 otherwise. Similarly Sobel(PRE(i,j)) and Sobel(CUR(i,j)) get a value 1 when PRE(i,j) and CUR(i,j) are edge points, respectively. They get the value 0 otherwise.

It should be noted that this algorithm relabels each pixel labeled '1' in the difference picture in the following manner: if it is an edge point in the difference picture alone it is labeled '2'; if it is an edge point in the difference picture and the previous frame alone, it is labeled '3'; if it is an edge point in the difference picture and the current frame alone, it is labeled '4'; and if it is an edge point in all the three, it is labeled '5'. The implementation of the algorithm can be provided by AND and NAND gates, as shown in FIG. 6.

Feature Extractor

Accordingly, as described above, and shown in FIG. 4 each region selected by the region selector 40 is input to the difference picture edge detector 42 and then to the labeled picture generator 46 for relabeling. The labeling is done depending on whether the pixels are edge points in the previous and current frames and the difference picture. The labels indicate the edginess of the pixel as described in the previous section. The feature extractor 48 then takes as input the labeled image generated by the labeled picture generator 46.

The next step is to extract the following features for each labeled region:

(a) $N_c$: the number of current frame edge fragments;

(b) $N_p$: the number of previous frame edge fragments;

(c) $C_c$: a Boolean representing the closeness of the current frame edge fragment;

(d) $C_p$: a Boolean representing the closeness of the previous frame edge fragment;

(e) CURCNT: the number of current frame edge points; and (f) PRECNT: the number of previous frame edge points.

In the above, $N_p$ is the number of fragments of edge points labeled 3 or 5, and $N_c$ is the number of fragments of edge points labeled 4 or 5. CURCNT is the total number of points labeled 4 or 5, and PRECNT is the total number of points labeled 3 or 5 in the region. $C_c$ and $C_p$ are Boolean values that can be deduced on-the-fly. The algorithm for computing $N_c$, $N_p$, CURCNT, and PRECNT requires on-the-fly scanning of the labeled image just once. The hardware scheme, shown in FIG. 4 that implements the algorithm will be described herein in more detail.

The algorithm: Initially the values of $N_c$, $N_p$, $C_c$, $C_p$, CURCNT, and PRECNT are set to 0. The values $N_p$ and $N_c$ are collected in up-down counters 80b, 80d, respectively, while PRE-CNT and CUR-CNT are stored in up counters 80f, 80e, respectively. The parameters $C_p$ and $C_c$ are stored in single-bit flip-flops 80a, 80d, respectively. The labeled picture is then scanned row-by-row from left to right one pixel at a time. The counter CURCNT 80e is incremented by one if the label of the candidate pixel (pixel under consideration) is 3 or 5. The PRECNT counter 80f is incremented by one if the label of the candidate pixel is 4 or 5.

For each candidate pixel, the label of that pixel and the labels of some of its neighborhood pixels are examined to determine which one of the following three cases is true:

1) the candidate pixel is the starting point of a new edge fragment, 2) the candidate pixel is a point of a previously detected edge fragment, or 3) the candidate pixel is a merging point for two previously detected edge fragments.

Figure 7:
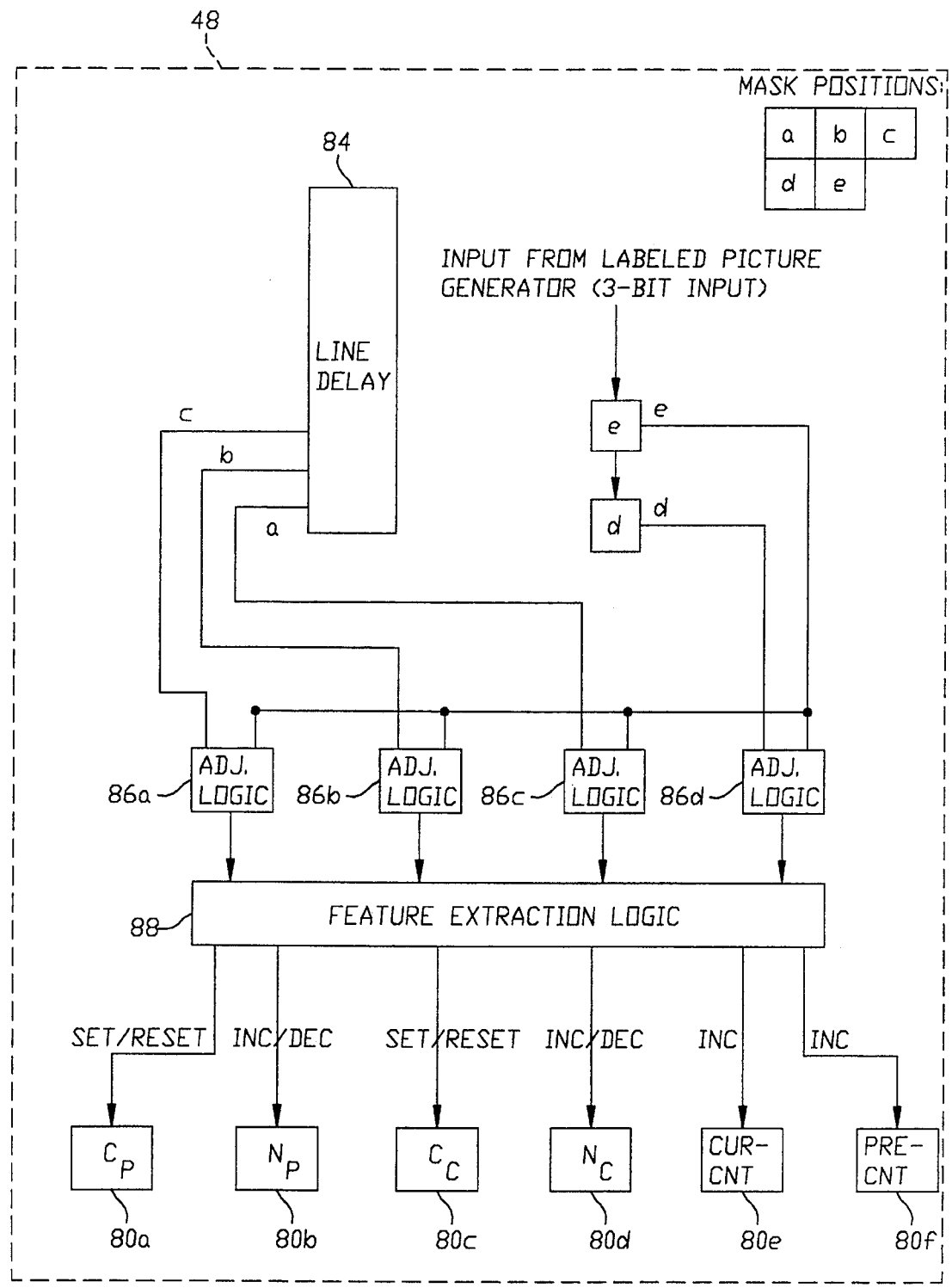
FIG. 7 is a schematic illustration of the hardware for the feature extractor of the motion detection processor module of FIG. 3.

FIG. 7 shows a candidate pixel e and its neighborhood. Only four neighborhood pixels, a, b, c, and d, are required to determine the property of the candidate pixels and its contribution to the above mentioned features. A candidate pixel can be the starting point of one or more edge fragments in several obvious situations. Letting label(i) denote the label of pixel i, these situations are as follows:

1) If label(e)=3 and none of its four neighbors has a label 3 or 5, the candidate pixel e is taken to be the starting point of a new previous frame edge fragment. In this case, PRECNT counter 80f and $N_p$ counter 80b are incremented by one.

2) If label(e)=4 and none of its four neighbors has a label 4 or 5, the candidate pixel e is taken to be the starting point of a new current frame edge fragment. In this case, $N_c$ counter 80d and CURCNT counter 80e are incremented by one.

3) If label(e)=5 and none of its four neighbors has a label 5 or 3, the candidate pixel e is taken to be the starting point of a new previous frame edge fragment. In this case, $N_p$ counter 80b is incremented by one.

4) If label(e)=5 and none of its four neighbors has a label 5 or 4, the candidate pixel e is taken to be the starting point of a new current frame edge fragment. In this case, $N_c$ counter 80d is incremented by one.

5) If label(e)=5 and none of its four neighbors has a label 3, 4, or 5, the candidate pixel e is taken to be the starting point of a new current frame edge fragment and a new previous frame edge fragment. In this case, $N_c$ counter 80d and $N_p$ counter 80b are incremented by one.

A candidate pixel can become the merging point of two previously detected frame edge fragments in one of the following situations:

1) If label(e)=3 and 3 or 5 is the label of one or both pixels a and d, and 3 or 5 is the label of pixel c, the candidate pixel e is the merging point of two previously detected previous frame edge fragments. In this case, $N_p$ counter 80b is decremented by one.

2) If label(e)=4 and 4 or 5 is the label of one or both pixels a and d, and 4 or 5 is the label of pixel c, the candidate pixel e is the merging point of two previously detected current frame edge fragments. In this case, $N_c$ counter 80d is decremented by one.

3) If ( (label(e)=5) and (3 or 5 is the label of one or both pixels a and d) and (3 is the label of pixel c) ) or ( (label(e)=5) and (3 is the label of one or both pixels a and d) and (3 or 5 is the label of pixel c) ), then the candidate pixel e is the merging point of two previously detected previous frame edge fragments. In this case, $N_p$ counter 80d is decremented by one.

4) If (label(e)=5 and 4 or 5 is the label of one or both pixels a and d, and 4 is the label of pixel c) or (label(e)=5 and 4 is the label of one or both pixels a and d, and 4 or 5 is the label of pixel c), the candidate pixel e is the merging point of two previously detected current frame edge fragments. In this case, $N_c$ counter 80d is decremented by one.

5) If label(e)=5 and (label(a)=5 or label(d)=5) and label(c)=5, the candidate pixel e is the merging point of two previously detected current frame edge fragments, as well as two previously detected previous frame edge fragments. In this case, both $N_c$ counter 80d and $N_p$ counter 80b are decremented by one.

If the conditions for fragment starting point and fragment merging point are not satisfied by a candidate pixel then that candidate pixel is simply a point of some previously detected edge fragment.

Finally, the closedness of the edge fragments is determined as follows: if the final value of $N_c$ ($N_p$) is 0 but it attained a non-zero value at any intermediate point, then a single closed current (previous) frame edge fragment is present in the region. In this case $N_c$ counter 80d and $C_c$ counter 80c ($N_p$ and $C_p$) are incremented by one.

Hardware Implementation: One type of hardware design for implementing the above algorithm is given in FIG. 7. The mask positions are shown in the figure and labeled as a,b, . . . e, where e is the central pixel in consideration. In order to ensure access to the four neighboring pixels, a line delay buffer 84 of size n+2 is maintained. Each register in the line delay buffer is a 3-bit register, since the labels are made of 3 bits. The central pixel is compared using adjacency logic (at 86a–86d) with the four neighboring pixels to check if the adjacency conditions are met.

The feature extractor logic 88 consists of a single-stage gate network of NAND gates, NOR gates and inverters which compute the appropriate counters to be incremented or decremented based on the output of the adjacency logic 86a–86d. The adjacency logic is given in FIG. 8 and described herein in more detail. The label in position e is decoded and the three outputs of the decoder shown in FIG. 8 correspond to labels 3, 4 and 5 (the other outputs e.g., 0, 1, 2, being disregarded). These are used as control signals for incrementing and decrementing the appropriate counters. The adjacency logic outputs a '1' if the corresponding pixel is adjacent to the central pixel. For example, if the pixel under consideration has a label 5, both X and Y will be 0, while Z (which corresponds to label 5) will be 1. If none of the neighboring pixels satisfy the adjacency condition, the central pixel is the starting of a new component if it is labeled 3 or 4. The signal is used to increment the corresponding counters $N_p$ or $N_c$ respectively.

Counter PRECNT 80f is incremented every time when the central pixel is labeled 3 or 5 and counter CURCNT 80e is incremented every time when the central pixel is a 4 or 5. Two flip-flops are used to derive the $C_c$ and $C_p$ values. The increment signal to $N_c$ is used to set the flip flop $C_c$ to TRUE and after the final value of $N_c$ is determined, if $N_c$ is not zero and $C_c$ has been set, then $C_c$ is reset to FALSE (similarly for $C_p$). If $N_c$ is ever incremented and then reached a final value of zero, it corresponds to a closed region as detected by the algorithm, which means $C_c$ is then set to TRUE. Once the entire image has been scanned, the values in the counters and the flip-flops can be read out and used in the region classifier 50 (FIG. 3).

Figure 8:
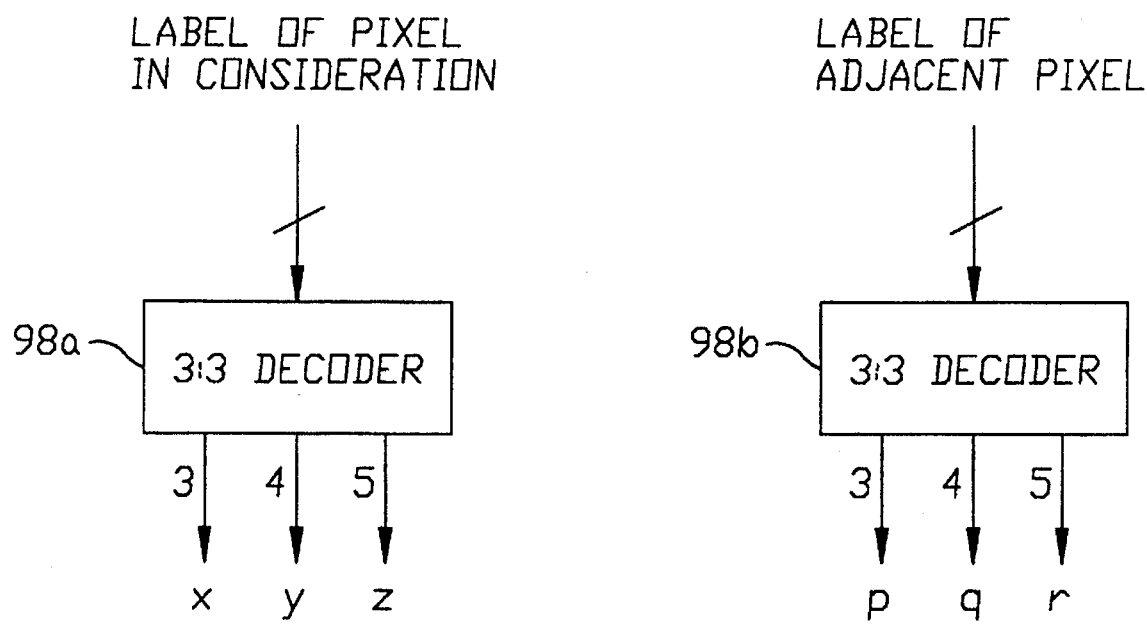
FIG. 8 is a schematic illustration of the adjacency logic and hardware for the feature extractor of FIG. 7.

Adjacency Logic: The adjacency table in FIG. 8 illustrates the various possibilities for satisfying adjacency condition. If the central pixel is labeled 5, then the neighboring pixel is adjacent if it is labeled 3, 4 or 5. If the central pixel is labeled 4, then the neighboring pixel is adjacent if it is labeled 4 or 5. Similarly, if the central pixel e is labeled 3, then the neighboring pixel is said to be adjacent if it is labeled 3 or 5. The labels of 0, 1 and 2 are disregarded as these labels represent pixels which do not effect the motion calculations.

The circuit consists of two 3:3 decoders 98a, 98b for decoding the corresponding labels in which only 3 inputs and 3 outputs are used (hence, the decoders are labeled 3:3). The decoder outputs are labeled as x,y,z and p,q,r for the central pixel and the neighboring pixel, respectively. The adjacency function is then written as F=x (p+r)+y (q+r)+z (p+q+r). The equation can be implemented as a simple combinational gate network of OR gates and AND gates.

Region Classifier

Figure 1:
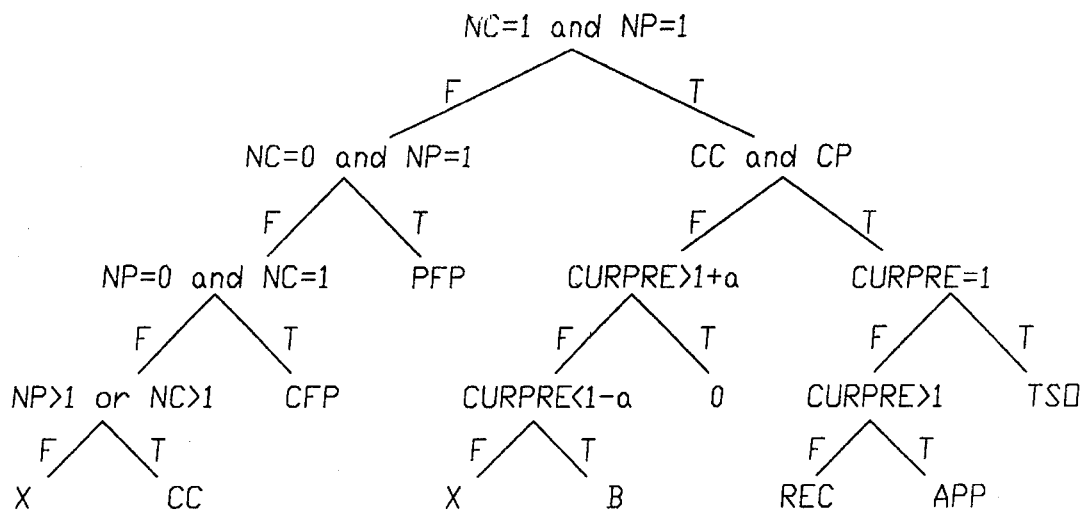
FIG. 1 is a schematic illustration of a decision tree for determining motion characteristics according to the present invention.
Figure 9:
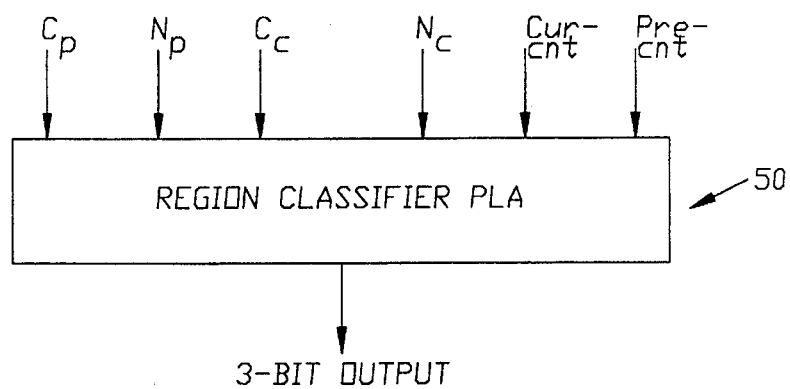
FIG. 9 is a schematic illustration of the block diagram for the region classifier logic for the motion detection processor module of FIG. 2.

The block diagram for the region classifier 50 is given in FIG. 9. The inputs to the classifier are the parameters extracted by the feature extractor stage 48 (FIG. 3) and the encoded output will consist of 3 bits that will indicate one of the eight types or classifications of motion occurring within the analyzed region, depending upon the decision tree (FIG. 1). For example, the following 3 bit outputs can correspond to the indicated directions of motion:

000:TSO (translation of one moving object)

001:APP (approaching object)

010:REC (receding object)

011: B (uncovering of background by moving object)

100: X (uncertain)

101: OC (occlusion)

110: PFP (pre. frame position of a totally displaced object)

111: CFP (cur. frame position of a totally displaced object)

The decision tree can be implemented using a programmable logic array (PLA) or a combinational gate network.

Chip Implementation Issues

The architecture of each processor is simple and organized as a multi-stage linear pipeline with no feedback logic, or in a systolic array, as indicated previously. The region selector 40 (FIG. 3) is a simple logic that requires a single cycle for its computation. A 2n+3 cycle delay is incurred once in the difference picture edge detection 42 logic in order to fill the FIFO buffer with the neighborhood data, after which a result is output during each clock cycle. This requires for the overall computation $n^2$ cycles for a n×n image.

The labeled picture generator 42 can be implemented as part of the edge detector since it consists of a single level of gates. Again, a delay of n+2 cycles is incurred in order to fill the FIFO in the feature extractor 48 after which two cycles are needed for the adjacency logic (FIG. 7) and updating of the counter. The $n^2$ cycles needed for feature extraction after the fill up time can be overlapped with the difference picture edge detection process.

The region classification can be implemented in a single cycle using a programmable logic array or simple combinational logic. Thus, the total number of cycles to process a pair of frames (current and previous) is $(1+(2n+3)+(n+2+n^2)+2+1)$ which sums to $n^2+3n+9$ cycles. Thus, to process a pair of 512×512 frames, the chip will require 6.4 milliseconds operating at 40 $MH_z$. For frames of sizes 256×256 and 128×128, the chip will require 0.4 and 0.15 milliseconds, respectively. The computations mentioned above cannot be further parallelized since the feature extraction stage is inherently sequential in nature. Since the overall operation is pipelined, the present invention provides the maximum throughput possible for this algorithm.

Figure 10:
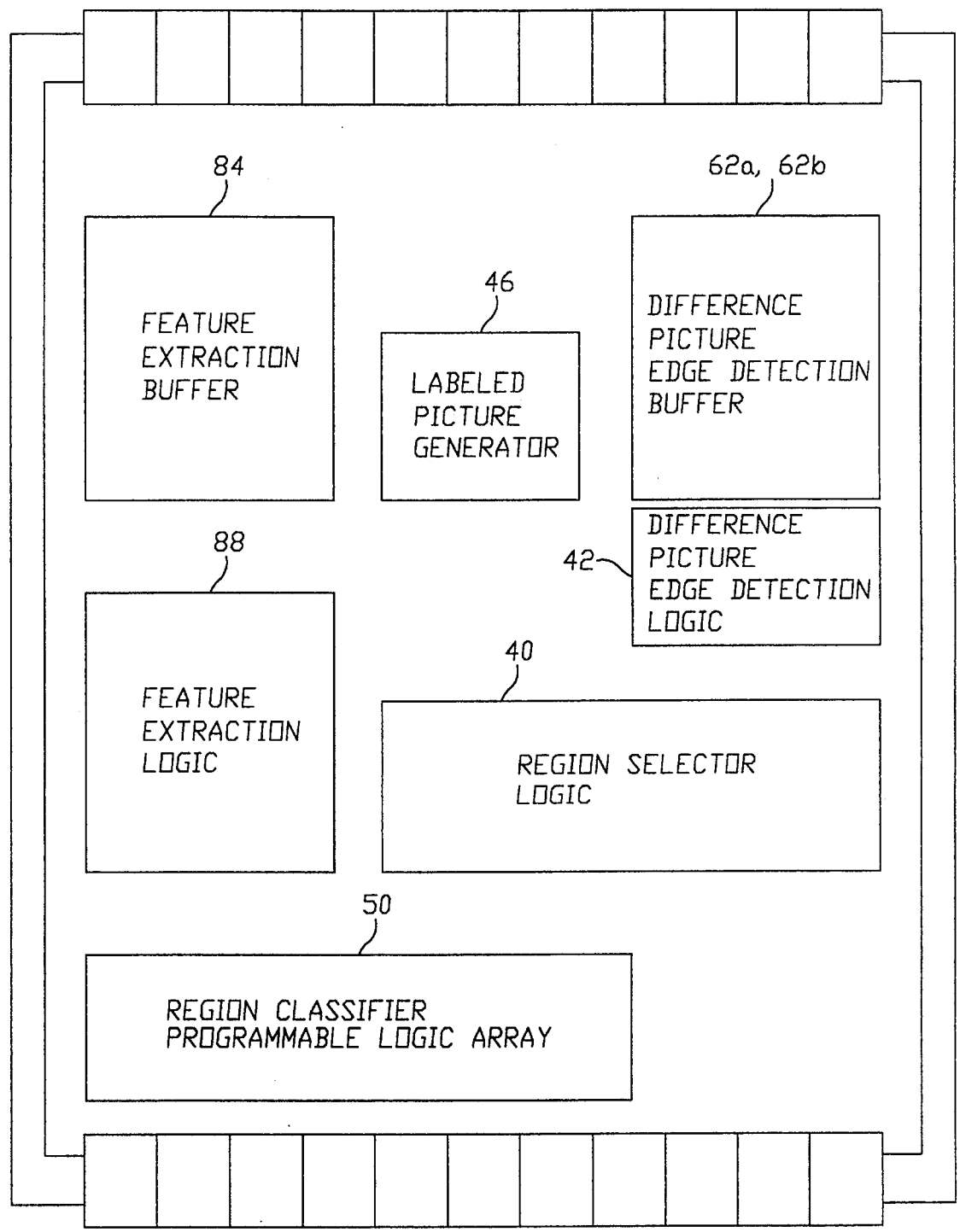
FIG. 10 is a schematic illustration of a floor plan of the VLSI chip for the dynamic scene analysis system of the present invention.

The architecture can be implemented on a CMOS VLSI chip. For example, the floor plan for the chip can be laid out as schematically illustrated in FIG. 10. Each motion detection processor occupies about 1583 lambda×2450 lambda with about 12,000 transistors. In terms of the layout space required for the processor logic, it is believed that about up to 30 processors can be laid out within a single chip. Although it is reasonable to assume 30 different regions for motion analysis in a scene, in real-life applications with complex scenes of much larger number of regions one of the following two approaches can be taken. The regions can be broken into sets of 30 regions each and the chip can be used to process one set at a time. The other approach is to use several chips in parallel in order to realize processor arrays of larger sizes. The design of the chip is such that expansion can be done with ease. The output of the chip can be used by an attentive phase motion analyzer, for image segmentation based on motion information and/or for object tracking and other similar applications.

Accordingly, as described above, the present invention provides a VLSI architecture for a difference picture based dynamic scene analysis technique. VLSI technology can be utilized to overcome the limitations caused by the computational expenses of image processing and computer vision techniques. The architecture fully utilizes the parallelism possible and consists of a set of parallel processors that can be implemented as a linear pipeline. The proposed architecture is efficient since the architecture consists of several processors operating in parallel, with each processor analyzing a different region for motion classification. The approach provides economic advantages since each processor consists of very simple logic and the whole system can be realized as a single VLSI chip.

The principles, embodiments, and modes of operation of the present invention have been described in the foregoing specification. The invention which is intended to be protected herein should not, however, be construed to the particular form described as it is to be regarded as illustrative rather than restrictive. Variations and changes may be made by those skilled in the art without departing from the spirit of the present invention. Accordingly, the foregoing detailed description should be exemplary in nature and not as limiting as to the scope and spirit of the invention set forth in the appended claims.

What is claimed is:

1. Circuit architecture for dynamic scene analysis, comprising:

difference picture generator hardware which takes as inputs pixel values corresponding to the same location in the scene from previous and current time frames and provides as output a representation of the difference picture of the scene, connected components hardware which takes as input the output of the difference picture generator and provides as output connected component labels of the difference picture, edge detector hardware which take as input pixel values corresponding to the same location in the scene from previous and current time frames and provide as outputs the edge values of the current and previous frames, and a plurality of motion detection processors which analyze separate regions of the difference picture, each of said motion detection processors having hardware which takes as input a connected component label of the difference picture in one region of the difference picture, the edge value in the current frame and the edge value in the previous frame, determines the motion relationship between each pixel and a predetermined set of neighborhood pixels, and provides as output a value representing the type of motion occurring in that region depending upon the motion relationship between each pixel and the neighborhood pixels;

wherein each of said motion detection processors has a feature extractor stage which determines the motion parameters of the region;

wherein said feature extractor has means for comparing each pixel in the region with the predetermined set of neighborhood pixels to determine the adjacency of the pixel to the neighborhood pixels;

wherein said feature extractor has means for determining the number of current frame edge fragments, the number of previous frame edge fragments, a boolean value representing the closedness of the current frame edge fragment, a boolean value representing the closedness of the previous frame edge fragment, and the number of current and previous frame edge points depending on the adjacency of the pixel to the neighborhood pixels;

wherein said means for determining the number of current frame edge fragments, the number of previous frame edge fragments, a boolean value representing the closedness of the current frame edge fragment, a boolean value representing the closedness of the previous frame edge fragment, and the number of current and previous frame edge points includes counter means and flip-flop means;

wherein said plurality of motion detectors are arranged in a systolic array; and wherein each of said motion detection processors has a labeled picture generator in circuit communication with said feature extractor, said labeled picture generator associating with each pixel a k-bit label, and wherein said feature extractor comprises:

(a) a line delay having a plurality of k-bit registers connected in circuit communication, at least one of said k-bit registers corresponding to a predetermined pixel location and at least two other of said k-bit registers corresponding to a predetermined neighbor pixel location of said predetermined pixel location, said predetermined pixel location having associated therewith a predetermined pixel and each of said predetermined neighbor pixel locations having associated therewith a predetermined neighborhood pixel;

(b) a plurality of adjacency logic units, each of said adjacency logic units being in circuit communication with:

(i) the at least one k-bit register of said line delay corresponding to said predetermined pixel location and (ii) at least one other k-bit register of said line delay, said other k-bit register corresponding to one of said predetermined neighbor pixel locations; and (c) feature extraction logic in circuit communication with said plurality of adjacency logic units.

2. Circuit architecture for dynamic scene analysis, comprising:

difference picture generator hardware which takes as inputs pixel values corresponding to the same location in the scene from previous and current time frames and provides as output a representation of the difference picture of the scene, connected components hardware which takes as input the output of the difference picture generator and provides as output connected component labels of the difference picture, edge detector hardware which take as input pixel values corresponding to the same location in the scene from previous and current time frames and provide as outputs the edge values of the current and previous frames, and a plurality of motion detection processors which analyze separate regions of the difference picture, each of said motion detection processors having hardware which takes as input a connected component label of the difference picture in one region of the difference picture, the edge value in the current frame and the edge value in the previous frame, determines the motion relationship between each pixel and a predetermined set of neighborhood pixels, and provides as output a value representing the type of motion occurring in that region depending upon the motion relationship between each pixel and the neighborhood pixels;

wherein each of said motion detection processors has a feature extractor stage which determines the motion parameters of the region;

wherein said feature extractor has means for comparing each pixel in the region with the predetermined set of neighborhood pixels to determine the adjacency of the pixel to the neighborhood pixels;

wherein said feature extractor has means for determining the number of current frame edge fragments, the number of previous frame edge fragments, a boolean value representing the closedness of the current frame edge fragment, a boolean value representing the closedness of the previous frame edge fragment, and the number of current and previous frame edge points depending on the adjacency of the pixel to the neighborhood pixels;

wherein said means for determining the number of current frame edge fragments, the number of previous frame edge fragments, a boolean value representing the closedness of the current frame edge fragment, a boolean value representing the closedness of the previous frame edge fragment, and the number of current and previous frame edge points includes counter means and flip-flop means;

wherein said plurality of motion detectors are arranged in a systolic array; and wherein each of said motion detection processors has a labeled picture generator in circuit communication with said feature extractor, said labeled picture generator associating with each pixel a k-bit label, and wherein said feature extractor comprises:

(a) a line delay having a plurality of k-bit registers connected in circuit communication, at least one of said k-bit registers corresponding to a predetermined pixel location and at least two other of said k-bit registers corresponding to a predetermined neighbor pixel location of said predetermined pixel location, said predetermined pixel location having associated therewith a predetermined pixel and each of said predetermined neighbor pixel locations having associated therewith a predetermined neighborhood pixel;

(b) a plurality of adjacency logic units, each of said adjacency logic units being in circuit communication with:
(i) the at least one k-bit register of said line delay corresponding to said predetermined pixel location and
(ii) at least one other k-bit register of said line delay, said other k-bit register corresponding to one of said predetermined neighbor pixel locations;

(c) feature extraction logic in circuit communication with said plurality of adjacency logic units;

(d) a first bistable circuit in circuit communication with said feature extraction logic, said first bistable circuit storing a value corresponding to the closedness of the current frame edge fragment;

(e) a second bistable circuit in circuit communication with said feature extraction logic, said second bistable circuit storing a value corresponding to the closedness of the previous frame edge fragment;

(f) a first counter in circuit communication with said feature extraction logic, said first counter storing a value corresponding to the number of current frame edge fragments;

(g) a second counter in circuit communication with said feature extraction logic, said second counter storing a value corresponding to the number of previous frame edge fragments;

(h) a third counter in circuit communication with said feature extraction logic, said third counter storing a value corresponding to the number of current frame edge pixels;

(i) a fourth counter in circuit communication with said feature extraction logic, said fourth counter storing a value corresponding to the number of previous frame edge pixels;

(j) a region classifier in circuit communication with said first and second bistable circuits and said first, second, third, and fourth counters, said region classifier classifying the motion in the region as being at least one of a predetermined set of classifications.

3. Circuit architecture for dynamic scene analysis, comprising:

difference picture generator hardware which takes as inputs pixel values corresponding to the same location in the scene from previous and current time frames and provides as output a representation of the difference picture of the scene, connected components hardware which takes as input the output of the difference picture generator and provides as output connected component labels of the difference picture, edge detector hardware which take as input pixel values corresponding to the same location in the scene from previous and current time frames and provide as outputs the edge values of the current and previous frames, and a plurality of motion detection processors which analyze separate regions of the difference picture, each of said motion detection processors having hardware which takes as input a connected component label of the difference picture in one region of the difference picture, the edge value in the current frame and the edge value in the previous frame, determines the motion relationship between each pixel and a predetermined set of neighborhood pixels, and provides as output a value representing the type of motion occurring in that region depending upon the motion relationship between each pixel and the neighborhood pixels;

wherein said plurality of motion detection processors are arranged in a systolic array; and wherein each of said motion detection processors has a labeled picture generator in circuit communication with said feature extractor, said labeled picture generator associating with each pixel a k-bit label, and wherein said feature extractor comprises:

(a) a line delay having a plurality of k-bit registers connected in circuit communication, at least one of said k-bit registers corresponding to a predetermined pixel location and at least two other of said k-bit registers corresponding to a predetermined neighbor pixel location of said predetermined pixel location, said predetermined pixel location having associated therewith a predetermined pixel and each of said predetermined neighbor pixel locations having associated therewith a predetermined neighborhood pixel;

(b) a plurality of adjacency logic units, each of said adjacency logic units being in circuit communication with:

(i) the at least one k-bit register of said line delay corresponding to said predetermined pixel location and (ii) at least one other k-bit register of said line delay, said other k-bit register corresponding to one of said predetermined neighbor pixel locations; and (c) feature extraction logic in circuit communication with said plurality of adjacency logic units.

4. Circuit architecture for dynamic scene analysis, comprising:

difference picture generator hardware which takes as inputs pixel values corresponding to the same location in the scene from previous and current time frames and provides as output a representation of the difference picture of the scene, connected components hardware which takes as input the output of the difference picture generator and provides as output connected component labels of the difference picture, edge detector hardware which take as input pixel values corresponding to the same location in the scene from previous and current time frames and provide as outputs the edge values of the current and previous frames, and a plurality of motion detection processors which analyze separate regions of the difference picture, each of said motion detection processors having hardware which takes as input a connected component label of the difference picture in one region of the difference picture, the edge value in the current frame and the edge value in the previous frame, determines the motion relationship between each pixel and a predetermined set of neighborhood pixels, and provides as output a value representing the type of motion occurring in that region depending upon the motion relationship between each pixel and the neighborhood pixels;

wherein said plurality of motion detection processors are arranged in a systolic array; and wherein each of said motion detection processors has a labeled picture generator in circuit communication with said feature extractor, said labeled picture generator associating with each pixel a k-bit label, and wherein said feature extractor comprises:

(a) a line delay having a plurality of k-bit registers connected in circuit communication, at least one of said k-bit registers corresponding to a predetermined pixel location and at least two other of said k-bit registers corresponding to a predetermined neighbor pixel location of said predetermined pixel location, said predetermined pixel location having associated therewith a predetermined pixel and each of said predetermined neighbor pixel locations having associated therewith a predetermined neighborhood pixel;

(b) a plurality of adjacency logic units, each of said adjacency logic units being in circuit communication with:

(i) the at least one k-bit register of said line delay corresponding to said predetermined pixel location and (ii) at least one other k-bit register of said line delay, said other k-bit register corresponding to one of said predetermined neighbor pixel locations;

(c) feature extraction logic in circuit communication with said plurality of adjacency logic units;

(d) a first bistable circuit in circuit communication with said feature extraction logic, said first bistable circuit storing a value corresponding to the closedness of the current frame edge fragment;

(e) a second bistable circuit in circuit communication with said feature extraction logic, said second bistable circuit storing a value corresponding to the closedness of the previous frame edge fragment;

(f) a first counter in circuit communication with said feature extraction logic, said first counter storing a value corresponding to the number of current frame edge fragments;

(g) a second counter in circuit communication with said feature extraction logic, said second counter storing a value corresponding to the number of previous frame edge fragments;

(h) a third counter in circuit communication with said feature extraction logic, said third counter storing a value corresponding to the number of current frame edge pixels;

(i) a fourth counter in circuit communication with said feature extraction logic, said fourth counter storing a value corresponding to the number of previous frame edge pixels;

(j) a region classifier in circuit communication with said first and second bistable circuits and said first, second, third, and fourth counters, said region classifier classifying the motion in the region as being at least one of a predetermined set of classifications.

5. Architecture for dynamic scene analysis, comprising:

difference picture generator means which takes as inputs pixel values corresponding to the same location in the scene from previous and current time frames and provides as output a representation of the difference picture of the scene, connected component hardware which takes as input the output of the difference picture generator and provides as output connected component labels of the difference picture, edge detector means which take as input pixel values corresponding to the same location in the scene from previous and current time frames and provide as outputs the edge values of the current and previous frames, and a plurality of motion detection processors which analyze separate regions of the difference picture, each of said motion detection processors having means which takes as input a connected component label of the difference picture in one of said separate regions, the edge value in the current frame, and the edge value in the previous frame, means for determining the motion relationship between each pixel and a predetermined set of neighborhood pixels, and means for providing as output a value representing the type of motion occurring in that region depending upon the motion relationship between the pixel and the neighborhood pixels;

wherein each of said motion detection processors includes a feature extractor stage having means for determining the number of current frame edge fragments, the number of previous frame edge fragments, a boolean value representing the closeness of the current frame edge fragment, a boolean value representing the closeness of the previous frame edge fragment, and the number of current and previous frame edge points;

wherein said plurality of motion detection processors are arranged in a systolic array; and wherein each of said motion detection processors has a labeled picture generator in circuit communication with said feature extractor, said labeled picture generator associating with each pixel a k-bit label, and wherein said feature extractor comprises:

(a) a line delay having a plurality of k-bit registers connected in circuit communication, at least one of said k-bit registers corresponding to a predetermined pixel location and at least two other of said k-bit registers corresponding to a predetermined neighbor pixel location of said predetermined pixel location, said predetermined pixel location having associated therewith a predetermined pixel and each of said predetermined neighbor pixel locations having associated therewith a predetermined neighborhood pixel;

(b) a plurality of adjacency logic units, each of said adjacency logic units being in circuit communication with:

(i) the at least one k-bit register of said line delay corresponding to said predetermined pixel location and (ii) at least one other k-bit register of said line delay, said other k-bit register corresponding to one of said predetermined neighbor pixel locations; and (c) feature extraction logic in circuit communication with said plurality of adjacency logic units.

6. Architecture for dynamic scene analysis, comprising:

difference picture generator means which takes as inputs pixel values corresponding to the same location in the scene from previous and current time frames and provides as output a representation of the difference picture of the scene, connected component hardware which takes as input the output of the difference picture generator and provides as output connected component labels of the difference picture, edge detector means which take as input pixel values corresponding to the same location in the scene from previous and current time frames and provide as outputs the edge values of the current and previous frames, and a plurality of motion detection processors which analyze separate regions of the difference picture, each of said motion detection processors having means which takes as input a connected component label of the difference picture in one of said separate regions, the edge value in the current frame, and the edge value in the previous frame, means for determining the motion relationship between each pixel and a predetermined set of neighborhood pixels, and means for providing as output a value representing the type of motion occurring in that region depending upon the motion relationship between the pixel and the neighborhood pixels;

wherein each of said motion detection processors includes a feature extractor stage having means for determining the number of current frame edge fragments, the number of previous frame edge fragments, a boolean value representing the closeness of the current frame edge fragment, a boolean value representing the closeness of the previous frame edge fragment, and the number of current and previous frame edge points;

wherein said plurality of motion detection processors are arranged in a systolic array; and wherein each of said motion detection processors has a labeled picture generator in circuit communication with said feature extractor, said labeled picture generator associating with each pixel a k-bit label, and wherein said feature extractor comprises:

(a) a line delay having a plurality of k-bit registers connected in circuit communication, at least one of said k-bit registers corresponding to a predetermined pixel location and at least two other of said k-bit registers corresponding to a predetermined neighbor pixel location of said predetermined pixel location, said predetermined pixel location having associated therewith a predetermined pixel and each of said predetermined neighbor pixel locations having associated therewith a predetermined neighborhood pixel;

(b) a plurality of adjacency logic units, each of said adjacency logic units being in circuit communication with:

(i) the at least one k-bit register of said line delay corresponding to said predetermined pixel location and (ii) at least one other k-bit register of said line delay, said other k-bit register corresponding to one of said predetermined neighbor pixel locations;

(c) feature extraction logic in circuit communication with said plurality of adjacency logic units;

(d) a first bistable circuit in circuit communication with said feature extraction logic, said first bistable circuit storing a value corresponding to the closeness of the current frame edge fragment;

(e) a second bistable circuit in circuit communication with said feature extraction logic, said second bistable circuit storing a value corresponding to the closeness of the previous frame edge fragment;

(f) a first counter in circuit communication with said feature extraction logic, said first counter storing a value corresponding to the number of current frame edge fragments;

(g) a second counter in circuit communication with said feature extraction logic, said second counter storing a value corresponding to the number of previous frame edge fragments;

(h) a third counter in circuit communication with said feature extraction logic, said third counter storing a value corresponding to the number of current frame edge pixels;

(i) a fourth counter in circuit communication with said feature extraction logic, said fourth counter storing a value corresponding to the number of previous frame edge pixels;

(j) a region classifier in circuit communication with said first and second bistable circuits and said first, second, third, and fourth counters, said region classifier classifying the motion in the region as being at least one of a predetermined set of classifications.

7. Circuit architecture for dynamic scene analysis, comprising:

difference picture generator hardware which takes as inputs pixel values corresponding to the same location in the scene from previous and current time frames and provides as output a representation of the difference picture of the scene, connected components hardware which takes as input the output of the difference picture generator and provides as output connected component labels of the difference picture, edge detector hardware which take as input pixel values corresponding to the same location in the scene from previous and current time frames and provide as outputs the edge values of the current and previous frames, and a plurality of motion detection processors which analyze separate regions of the difference picture, each of said motion detection processors having hardware which takes as input a connected component label of the difference picture in one region of the difference picture, the edge value in the current frame and the edge value in the previous frame, determines the motion relationship between each pixel and a predetermined set of neighborhood pixels, and provides as output a value representing the type of motion occurring in that region depending upon the motion relationship between each pixel and the neighborhood pixels;

wherein each of said motion detection processors has a feature extractor stage which determines the motion parameters of the region;

wherein said feature extractor has means for comparing each pixel in the region with the predetermined set of neighborhood pixels to determine the adjacency of the pixel to the neighborhood pixels;

wherein said feature extractor has means for determining the number of current frame edge fragments, the number of previous frame edge fragments, a boolean value representing the closedness of the current frame edge fragment, a boolean value representing the closedness of the previous frame edge fragment, and the number of current and previous frame edge points depending on the adjacency of the pixel to the neighborhood pixels;

wherein said means for determining the number of current frame edge fragments, the number of previous frame edge fragments, a boolean value representing the closedness of the current frame edge fragment, a boolean value representing the closedness of the previous frame edge fragment, and the number of current and previous frame edge points includes counter means and flip-flop means;

wherein said plurality of motion detectors are arranged in a systolic array;

wherein said difference picture generator hardware and said motion detection processors are characterized by operating on a cycle by cycle basis for a given frame, such that each cycle a pixel from the scene from previous and current time frames is input into said difference picture generator and each cycle a pixel is analyzed by said motion detection processors;

wherein each cycle said feature extractor of each of said motion detection processors compares at least one pixel in the region with the predetermined set of neighborhood pixels to determine the adjacency of the pixel to the neighborhood pixels; and wherein each of said motion detection processors has a labeled picture generator in circuit communication with said feature extractor, said labeled picture generator associating with each pixel a k-bit label, and wherein said feature extractor comprises:

(a) a line delay having a plurality of k-bit registers connected in circuit communication, at least one of said k-bit registers corresponding to a predetermined pixel location and at least two other of said k-bit registers corresponding to a predetermined neighbor pixel location of said predetermined pixel location, said predetermined pixel location having associated therewith a predetermined pixel and each of said predetermined neighbor pixel locations having associated therewith a predetermined neighborhood pixel;

(b) a plurality of adjacency logic units, each of said adjacency logic units being in circuit communication with:
(i) the at least one k-bit register of said line delay corresponding to said predetermined pixel location and
(ii) at least one other k-bit register of said line delay, said other k-bit register corresponding to one of said predetermined neighbor pixel locations; and (c) feature extraction logic in circuit communication with said plurality of adjacency logic units.

8. Circuit architecture for dynamic scene analysis, comprising:

difference picture generator hardware which takes as inputs pixel values corresponding to the same location in the scene from previous and current time frames and provides as output a representation of the difference picture of the scene, connected components hardware which takes as input the output of the difference picture generator and provides as output connected component labels of the difference picture, edge detector hardware which take as input pixel values corresponding to the same location in the scene from previous and current time frames and provide as outputs the edge values of the current and previous frames, and a plurality of motion detection processors which analyze separate regions of the difference picture, each of said motion detection processors having hardware which takes as input a connected component label of the difference picture in one region of the difference picture, the edge value in the current frame and the edge value in the previous frame, determines the motion relationship between each pixel and a predetermined set of neighborhood pixels, and provides as output a value representing the type of motion occurring in that region depending upon the motion relationship between each pixel and the neighborhood pixels;

wherein each of said motion detection processors has a feature extractor stage which determines the motion parameters of the region;

wherein said feature extractor has means for comparing each pixel in the region with the predetermined set of neighborhood pixels to determine the adjacency of the pixel to the neighborhood pixels;

wherein said feature extractor has means for determining the number of current frame edge fragments, the number of previous frame edge fragments, a boolean value representing the closedness of the current frame edge fragment, a boolean value representing the closedness of the previous frame edge fragment, and the number of current and previous frame edge points depending on the adjacency of the pixel to the neighborhood pixels;

wherein said means for determining the number of current frame edge fragments, the number of previous frame edge fragments, a boolean value representing the closedness of the current frame edge fragment, a boolean value representing the closedness of the previous frame edge fragment, and the number of current and previous frame edge points includes counter means and flip-flop means;

wherein said plurality of motion detectors are arranged in a systolic array;

wherein said difference picture generator hardware and said motion detection processors are characterized by operating on a cycle by cycle basis for a given frame, such that each cycle a pixel from the scene from previous and current time frames is input into said difference picture generator and each cycle a pixel is analyzed by said motion detection processors;

wherein each cycle said feature extractor of each of said motion detection processors compares at least one pixel in the region with the predetermined set of neighborhood pixels to determine the adjacency of the pixel to the neighborhood pixels; and wherein each of said motion detection processors has a labeled picture generator in circuit communication with said feature extractor, said labeled picture generator associating with each pixel a k-bit label, and wherein said feature extractor comprises:

(a) a line delay having a plurality of k-bit registers connected in circuit communication, at least one of said k-bit registers corresponding to a predetermined pixel location and at least two other of said k-bit registers corresponding to a predetermined neighbor pixel location of said predetermined pixel location, said predetermined pixel location having associated therewith a predetermined pixel and each of said predetermined neighbor pixel locations having associated therewith a predetermined neighborhood pixel;

(b) a plurality of adjacency logic units, each of said adjacency logic units being in circuit communication with:
  (i) the at least one k-bit register of said line delay corresponding to said predetermined pixel location and
  (ii) at least one other k-bit register of said line delay, said other k-bit register corresponding to one of said predetermined neighbor pixel locations;

(c) feature extraction logic in circuit communication with said plurality of adjacency logic units;

(d) a first bistable circuit in circuit communication with said feature extraction logic, said first bistable circuit storing a value corresponding to the closedness of the current frame edge fragment;

(e) a second bistable circuit in circuit communication with said feature extraction logic, said second bistable circuit storing a value corresponding to the closedness of the previous frame edge fragment;

(f) a first counter in circuit communication with said feature extraction logic, said first counter storing a value corresponding to the number of current frame edge fragments;

(g) a second counter in circuit communication with said feature extraction logic, said second counter storing a value corresponding to the number of previous frame edge fragments;

(h) a third counter in circuit communication with said feature extraction logic, said third counter storing a value corresponding to the number of current frame edge pixels;

(i) a fourth counter in circuit communication with said feature extraction logic, said fourth counter storing a value corresponding to the number of previous frame edge pixels;

(j) a region classifier in circuit communication with said first and second bistable circuits and said first, second, third, and fourth counters, said region classifier classifying the motion in the region as being at least one of a predetermined set of classifications.

9. Circuit architecture for dynamic scene analysis, comprising:

difference picture generator hardware which takes as inputs pixel values corresponding to the same location in the scene from previous and current time frames and provides as output a representation of the difference picture of the scene, connected components hardware which takes as input the output of the difference picture generator and provides as output connected component labels of the difference picture, edge detector hardware which take as input pixel values corresponding to the same location in the scene from previous and current time frames and provide as outputs the edge values of the current and previous frames, and a plurality of motion detection processors which analyze separate regions of the difference picture, each of said motion detection processors having hardware which takes as input a connected component label of the difference picture in one region of the difference picture, the edge value in the current frame and the edge value in the previous frame, determines the motion relationship between each pixel and a predetermined set of neighborhood pixels, and provides as output a value representing the type of motion occurring in that region depending upon the motion relationship between each pixel and the neighborhood pixels;

wherein each of said motion detection processors has a labeled picture generator in circuit communication with a feature extractor, said labeled picture generator associating with each pixel a k-bit label;

wherein said feature extractor comprises:

(a) a line delay having a plurality of k-bit registers connected in circuit communication, at least one of said k-bit registers corresponding to a predetermined pixel location and at least two other of said k-bit registers corresponding to a predetermined neighbor pixel location of said predetermined pixel location, said predetermined pixel location having associated therewith a predetermined pixel and each of said predetermined neighbor pixel locations having associated therewith a predetermined neighborhood pixel;

(b) a plurality of adjacency logic units, each of said adjacency logic units being in circuit communication with:

(i) the at least one k-bit register of said line delay corresponding to said predetermined pixel location and (ii) at least one other k-bit register of said line delay, said other k-bit register corresponding to one of said predetermined neighbor pixel locations;

(c) feature extraction logic in circuit communication with said plurality of adjacency logic units;

(d) a first bistable circuit in circuit communication with said feature extraction logic, said first bistable circuit storing a value corresponding to the closedness of the current frame edge fragment;

(e) a second bistable circuit in circuit communication with said feature extraction logic, said second bistable circuit storing a value corresponding to the closedness of the previous frame edge fragment;

(f) a first counter in circuit communication with said feature extraction logic, said first counter storing a value corresponding to the number of current frame edge fragments;

(g) a second counter in circuit communication with said feature extraction logic, said second counter storing a value corresponding to the number of previous frame edge fragments;

(h) a third counter in circuit communication with said feature extraction logic, said third counter storing a value corresponding to the number of current frame edge pixels;

(i) a fourth counter in circuit communication with said feature extraction logic, said fourth counter storing a value corresponding to the number of previous frame edge pixels;

(j) a region classifier in circuit communication with said first and second bistable circuits and said first, second, third, and fourth counters, said region classifier classifying the motion in the region as being at least one of a predetermined set of classifications;

(1) said feature extraction logic incrementing said second counter and said fourth counter responsive to:

(i) the k-bit label corresponding to the predetermined pixel indicating that the predetermined pixel is (an edge point in the difference picture) and (an edge point in the previous frame) but not (an edge point in the current frame), and (ii) none of the k-bit labels corresponding to the predetermined neighborhood pixels indicating that any of predetermined neighborhood pixels are either:

a. (an edge point in the difference picture) and (an edge point in the previous frame) but not (an edge point in the current frame), or b. (an edge point in the difference picture) and (an edge point in the current frame) and (an edge point in the previous frame);

(2) said feature extraction logic incrementing said first counter and said third counter responsive to:

(i) the k-bit label corresponding to the predetermined pixel indicating that the predetermined pixel is (an edge point in the difference picture) and (an edge point in the current frame) but not (an edge point in the previous frame), and (ii) none of the k-bit labels corresponding to the predetermined neighborhood pixels indicating that any of predetermined neighborhood pixels are either:

a. (an edge point in the difference picture) and (an edge point in the current frame) but not (an edge point in the previous frame), or b. (an edge point in the difference picture) and (an edge point in the current frame) and (an edge point in the previous frame);

(3) said feature extraction logic incrementing said second counter responsive to:

(i) the k-bit label corresponding to the predetermined pixel indicating that the predetermined pixel is (an edge point in the difference picture) and (an edge point in the current frame) and (an edge point in the previous frame), and (ii) none of the k-bit labels corresponding to the predetermined neighborhood pixels indicating that any of predetermined neighborhood pixels are either:

a. (an edge point in the difference picture) and (an edge point in the previous frame) but not (an edge point in the current frame), or b. (an edge point in the difference picture) and (an edge point in the current frame) and (an edge point in the previous frame);

(4) said feature extraction logic incrementing said first counter responsive to:

(i) the k-bit label corresponding to the predetermined pixel indicating that the predetermined pixel is (an edge point in the difference picture) and (an edge point in the current frame) and (an edge point in the previous frame), and (ii) none of the k-bit labels corresponding to the predetermined neighborhood pixels indicating that any of predetermined neighborhood pixels are either:

a. (an edge point in the difference picture) and (an edge point in the current frame) but not (an edge point in the previous frame), or b. (an edge point in the difference picture) and (an edge point in the current frame) and (an edge point in the previous frame); and (5) said feature extraction logic incrementing said first counter and said second counter responsive to:

(i) the k-bit label corresponding to the predetermined pixel indicating that the predetermined pixel is (an edge point in the difference picture) and (an edge point in the current frame) and (an edge point in the previous frame), and (ii) none of the k-bit labels corresponding to the predetermined neighborhood pixels indicating that any of predetermined neighborhood pixels are either:

a. (an edge point in the difference picture) and (an edge point in the previous frame) but not (an edge point in the current frame), or b. (an edge point in the difference picture) and (an edge point in the current frame) but not (an edge point in the previous frame), or c. (an edge point in the difference picture) and (an edge point in the current frame) and (an edge point in the previous frame).

10. The circuit architecture for dynamic scene analysis according to claim 9:

(1) said feature extraction logic decrementing said second counter responsive to:

(i) the k-bit label corresponding to the predetermined pixel indicating that the predetermined pixel is (an edge point in the difference picture) and (an edge point in the previous frame) but not (an edge point in the current frame), and (ii) the k-bit labels corresponding to the predetermined neighborhood pixels indicating that:

a. at least one of the first and third predetermined neighborhood pixels is either:

1. (an edge point in the difference picture) and (an edge point in the previous frame) but not (an edge point in the current frame), or 2. (an edge point in the difference picture) and (an edge point in the current frame) and (an edge point in the previous frame), and
b. the second predetermined neighborhood pixel is either:
1. (an edge point in the difference picture) and (an edge point in the previous frame) but not (an edge point in the current frame), or
2. (an edge point in the difference picture) and (an edge point in the current frame) and (an edge point in the previous frame);

(2) said feature extraction logic decrementing said first counter responsive to:
(i) the k-bit label corresponding to the predetermined pixel indicating that the predetermined pixel is (an edge point in the difference picture) and (an edge point in the current frame) but not (an edge point in the previous frame), and
(ii) the k-bit labels corresponding to the predetermined neighborhood pixels indicating that:
a. at least one of the first and third predetermined neighborhood pixels is either:
1. (an edge point in the difference picture) and (an edge point in the current frame) but not (an edge point in the previous frame), or
2. (an edge point in the difference picture) and (an edge point in the current frame) and (an edge point in the previous frame), and
b. the second predetermined neighborhood pixel is either:
1. (an edge point in the difference picture) and (an edge point in the current frame) but not (an edge point in the previous frame), or
2. (an edge point in the difference picture) and (an edge point in the current frame) and (an edge point in the previous frame);

(3) said feature extraction logic decrementing said second counter responsive to:
(i) the k-bit label corresponding to the predetermined pixel indicating that the predetermined pixel is (an edge point in the difference picture) and (an edge point in the previous frame) and (an edge point in the current frame), and
(ii) the k-bit labels corresponding to the predetermined neighborhood pixels indicating that:
a. at least one of the first and third predetermined neighborhood pixels is either:
1. (an edge point in the difference picture) and (an edge point in the previous frame) but not (an edge point in the current frame), or
2. (an edge point in the difference picture) and (an edge point in the current frame) and (an edge point in the previous frame), and
b. the second predetermined neighborhood pixel is (an edge point in the difference picture) and (an edge point in the previous frame) but not (an edge point in the current frame);

(3') said feature extraction logic decrementing said second counter responsive to:
(i) the k-bit label corresponding to the predetermined pixel indicating that the predetermined pixel is (an edge point in the difference picture) and (an edge point in the previous frame) and (an edge point in the current frame), and
(ii) the k-bit labels corresponding to the predetermined neighborhood pixels indicating that:
a. at least one of the first and third predetermined neighborhood pixels is (an edge point in the difference picture) and (an edge point in the previous frame) but not (an edge point in the current frame), and
b. the second predetermined neighborhood pixel is either:
1. (an edge point in the difference picture) and (an edge point in the previous frame) but not (an edge point in the current frame), or
2. (an edge point in the difference picture) and (an edge point in the current frame) and (an edge point in the previous frame);

(4) said feature extraction logic decrementing said first counter responsive to:
(i) the k-bit label corresponding to the predetermined pixel indicating that the predetermined pixel is (an edge point in the difference picture) and (an edge point in the current frame) and (an edge point in the previous frame), and
(ii) the k-bit labels corresponding to the predetermined neighborhood pixels indicating that:
a. at least one of the first and third predetermined neighborhood pixels is either:
1. (an edge point in the difference picture) and (an edge point in the current frame) but not (an edge point in the previous frame), or
2. (an edge point in the difference picture) and (an edge point in the current frame) and (an edge point in the previous frame), and
b. the second predetermined neighborhood pixel is (an edge point in the difference picture) and (an edge point in the current frame) but not (an edge point in the previous frame);

(4') said feature extraction logic decrementing said first counter responsive to:
(i) the k-bit label corresponding to the predetermined pixel indicating that the predetermined pixel is (an edge point in the difference picture) and (an edge point in the current frame) and (an edge point in the previous frame), and
(ii) the k-bit labels corresponding to the predetermined neighborhood pixels indicating that:
a. at least one of the first and third predetermined neighborhood pixels is (an edge point in the difference picture) and (an edge point in the current frame) but not (an edge point in the previous frame), and
b. the second predetermined neighborhood pixel is either:
1. (an edge point in the difference picture) and (an edge point in the current frame) but not (an edge point in the previous frame), or
2. (an edge point in the difference picture) and (an edge point in the current frame) and (an edge point in the previous frame);

(5) said feature extraction logic decrementing said first counter and said second counter responsive to:
(i) the k-bit label corresponding to the predetermined pixel indicating that the predetermined pixel is (an edge point in the difference picture) and (an edge point in the current frame) and (an edge point in the previous frame), and
(ii) the k-bit labels corresponding to the predetermined neighborhood pixels indicating that:
(a. the first predetermined neighborhood pixels is (an edge point in the difference picture) and (an edge point in the current frame) and (an edge point in the previous frame), or b. either the first or third predetermined neighborhood pixels is (an edge point in the difference picture) and (an edge point in the current frame) and (an edge point in the previous frame)), and c. the second predetermined neighborhood pixel is (an edge point in the difference picture) and (an edge point in the current frame) and (an edge point in the previous frame).

11. The circuit architecture for dynamic scene analysis according to any of claims 2, 4, 6, or 8:

(1) said feature extraction logic incrementing said second counter and said fourth counter responsive to:

(i) the k-bit label corresponding to the predetermined pixel indicating that the predetermined pixel is (an edge point in the difference picture) and (an edge point in the previous frame) but not (an edge point in the current frame), and (ii) none of the k-bit labels corresponding to the predetermined neighborhood pixels indicating that any of predetermined neighborhood pixels are either:

a. (an edge point in the difference picture) and (an edge point in the previous frame) but not (an edge point in the current frame), or b. (an edge point in the difference picture) and (an edge point in the current frame) and (an edge point in the previous frame);

(2) said feature extraction logic incrementing said first counter and said third counter responsive to:

(i) the k-bit label corresponding to the predetermined pixel indicating that the predetermined pixel is (an edge point in the difference picture) and (an edge point in the current frame) but not (an edge point in the previous frame), and (ii) none of the k-bit labels corresponding to the predetermined neighborhood pixels indicating that any of predetermined neighborhood pixels are either:

a. (an edge point in the difference picture) and (an edge point in the current frame) but not (an edge point in the previous frame), or b. (an edge point in the difference picture) and (an edge point in the current frame) and (an edge point in the previous frame);

(3) said feature extraction logic incrementing said second counter responsive to:

(i) the k-bit label corresponding to the predetermined pixel indicating that the predetermined pixel is (an edge point in the difference picture) and (an edge point in the current frame) and (an edge point in the previous frame), and (ii) none of the k-bit labels corresponding to the predetermined neighborhood pixels indicating that any of predetermined neighborhood pixels are either:

a. (an edge point in the difference picture) and (an edge point in the previous frame) but not (an edge point in the current frame), or b. (an edge point in the difference picture) and (an edge point in the current frame) and (an edge point in the previous frame);

(4) said feature extraction logic incrementing said first counter responsive to:

(i) the k-bit label corresponding to the predetermined pixel indicating that the predetermined pixel is (an edge point in the difference picture) and (an edge point in the current frame) and (an edge point in the previous frame), and (ii) none of the k-bit labels corresponding to the predetermined neighborhood pixels indicating that any of predetermined neighborhood pixels are either:

a. (an edge point in the difference picture) and (an edge point in the current frame) but not (an edge point in the previous frame), or b. (an edge point in the difference picture) and (an edge point in the current frame) and (an edge point in the previous frame); and (5) said feature extraction logic incrementing said first counter and said second counter responsive to:

(i) the k-bit label corresponding to the predetermined pixel indicating that the predetermined pixel is (an edge point in the difference picture) and (an edge point in the current frame) and (an edge point in the previous frame), and (ii) none of the k-bit labels corresponding to the predetermined neighborhood pixels indicating that any of predetermined neighborhood pixels are either:

a. (an edge point in the difference picture) and (an edge point in the previous frame) but not (an edge point in the current frame), or b. (an edge point in the difference picture) and (an edge point in the current frame) but not (an edge point in the previous frame), or c. (an edge point in the difference picture) and (an edge point in the current frame) and (an edge point in the previous frame).

12. The circuit architecture for dynamic scene analysis according to any of claims 2, 4, 6, or 8:

(1) said feature extraction logic causing said second counter and said fourth counter to count in a first direction responsive to:

(i) the k-bit label corresponding to the predetermined pixel indicating that the predetermined pixel is (an edge point in the difference picture) and (an edge point in the previous frame) but not (an edge point in the current frame), and (ii) none of the k-bit labels corresponding to the predetermined neighborhood pixels indicating that any of predetermined neighborhood pixels are either:

a. (an edge point in the difference picture) and (an edge point in the previous frame) but not (an edge point in the current frame), or b. (an edge point in the difference picture) and (an edge point in the current frame) and (an edge point in the previous frame);

(2) said feature extraction logic causing said first counter and said third counter to count in a first direction responsive to:

(i) the k-bit label corresponding to the predetermined pixel indicating that the predetermined pixel is (an edge point in the difference picture) and (an edge point in the current frame) but not (an edge point in the previous frame), and (ii) none of the k-bit labels corresponding to the predetermined neighborhood pixels indicating that any of predetermined neighborhood pixels are either:

a. (an edge point in the difference picture) and (an edge point in the current frame) but not (an edge point in the previous frame), or b. (an edge point in the difference picture) and (an edge point in the current frame) and (an edge point in the previous frame);

(3) said feature extraction logic causing said second counter to count in the first direction responsive to:

(i) the k-bit label corresponding to the predetermined pixel indicating that the predetermined pixel is (an edge point in the difference picture) and (an edge point in the current frame) and (an edge point in the previous frame), and (ii) none of the k-bit labels corresponding to the predetermined neighborhood pixels indicating that any of predetermined neighborhood pixels are either:
   a. (an edge point in the difference picture) and (an edge point in the previous frame) but not (an edge point in the current frame), or
   b. (an edge point in the difference picture) and (an edge point in the current frame) and (an edge point in the previous frame);

(4) said feature extraction logic causing said first counter to count in the first direction responsive to:
   (i) the k-bit label corresponding to the predetermined pixel indicating that the predetermined pixel is (an edge point in the difference picture) and (an edge point in the current frame) and (an edge point in the previous frame), and
   (ii) none of the k-bit labels corresponding to the predetermined neighborhood pixels indicating that any of predetermined neighborhood pixels are either:
      a. (an edge point in the difference picture) and (an edge point in the current frame) but not (an edge point in the previous frame), or
      b. (an edge point in the difference picture) and (an edge point in the current frame) and (an edge point in the previous frame); and (5) said feature extraction logic causing said first counter and said second counter to count in the first direction responsive to:
   (i) the k-bit label corresponding to the predetermined pixel indicating that the predetermined pixel is (an edge point in the difference picture) and (an edge point in the current frame) and (an edge point in the previous frame), and
   (ii) none of the k-bit labels corresponding to the predetermined neighborhood pixels indicating that any of predetermined neighborhood pixels are either:
      a. (an edge point in the difference picture) and (an edge point in the previous frame) but not (an edge point in the current frame), or
      b. (an edge point in the difference picture) and (an edge point in the current frame) but not (an edge point in the previous frame), or
      c. (an edge point in the difference picture) and (an edge point in the current frame) and (an edge point in the previous frame).

13. The circuit architecture for dynamic scene analysis according to any of claims 2, 4, 6, or 8:

(1) said feature extraction logic decrementing said second counter responsive to:
   (i) the k-bit label corresponding to the predetermined pixel indicating that the predetermined pixel is (an edge point in the difference picture) and (an edge point in the previous frame) but not (an edge point in the current frame), and
   (ii) the k-bit labels corresponding to the predetermined neighborhood pixels indicating that:
      a. at least one of the first and third predetermined neighborhood pixels is either:
         1. (an edge point in the difference picture) and (an edge point in the previous frame) but not (an edge point in the current frame), or
         2. (an edge point in the difference picture) and (an edge point in the current frame) and (an edge point in the previous frame), and
      b. the second predetermined neighborhood pixel is either:
         1. (an edge point in the difference picture) and (an edge point in the previous frame) but not (an edge point in the current frame), or
         2. (an edge point in the difference picture) and (an edge point in the current frame) and (an edge point in the previous frame);

(2) said feature extraction logic decrementing said first counter responsive to:
   (i) the k-bit label corresponding to the predetermined pixel indicating that the predetermined pixel is (an edge point in the difference picture) and (an edge point in the current frame) but not (an edge point in the previous frame), and
   (ii) the k-bit labels corresponding to the predetermined neighborhood pixels indicating that:
      a. at least one of the first and third predetermined neighborhood pixels is either:
         1. (an edge point in the difference picture) and (an edge point in the current frame) but not (an edge point in the previous frame), or
         2. (an edge point in the difference picture) and (an edge point in the current frame) and (an edge point in the previous frame), and
      b. the second predetermined neighborhood pixel is either:
         1. (an edge point in the difference picture) and (an edge point in the current frame) but not (an edge point in the previous frame), or
         2. (an edge point in the difference picture) and (an edge point in the current frame) and (an edge point in the previous frame);

(3) said feature extraction logic decrementing said second counter responsive to:
   (i) the k-bit label corresponding to the predetermined pixel indicating that the predetermined pixel is (an edge point in the difference picture) and (an edge point in the previous frame) and (an edge point in the current frame), and
   (ii) the k-bit labels corresponding to the predetermined neighborhood pixels indicating that:
      a. at least one of the first and third predetermined neighborhood pixels is either:
         1. (an edge point in the difference picture) and (an edge point in the previous frame) but not (an edge point in the current frame), or
         2. (an edge point in the difference picture) and (an edge point in the current frame) and (an edge point in the previous frame), and
      b. the second predetermined neighborhood pixel is (an edge point in the difference picture) and (an edge point in the previous frame) but not (an edge point in the current frame);

(3') said feature extraction logic decrementing said second counter responsive to:
   (i) the k-bit label corresponding to the predetermined pixel indicating that the predetermined pixel is (an edge point in the difference picture) and (an edge point in the previous frame) and (an edge point in the current frame), and
   (ii) the k-bit labels corresponding to the predetermined neighborhood pixels indicating that:
      a. at least one of the first and third predetermined neighborhood pixels is (an edge point in the difference picture) and (an edge point in the previous frame) but not (an edge point in the current frame), and
      b. the second predetermined neighborhood pixel is either:
         1. (an edge point in the difference picture) and (an edge point in the previous frame) but not (an edge point in the current frame), or 2. (an edge point in the difference picture) and (an edge point in the current frame) and (an edge point in the previous frame);

(4) said feature extraction logic decrementing said first counter responsive to:
  (i) the k-bit label corresponding to the predetermined pixel indicating that the predetermined pixel is (an edge point in the difference picture) and (an edge point in the current frame) and (an edge point in the previous frame), and
  (ii) the k-bit labels corresponding to the predetermined neighborhood pixels indicating that:
    a. at least one of the first and third predetermined neighborhood pixels is either:
      1. (an edge point in the difference picture) and (an edge point in the current frame) but not (an edge point in the previous frame), or
      2. (an edge point in the difference picture) and (an edge point in the current frame) and (an edge point in the previous frame), and
    b. the second predetermined neighborhood pixel is (an edge point in the difference picture) and (an edge point in the current frame) but not (an edge point in the previous frame);

(4') said feature extraction logic decrementing said first counter responsive to:
  (i) the k-bit label corresponding to the predetermined pixel indicating that the predetermined pixel is (an edge point in the difference picture) and (an edge point in the current frame) and (an edge point in the previous frame), and
  (ii) the k-bit labels corresponding to the predetermined neighborhood pixels indicating that:
    a. at least one of the first and third predetermined neighborhood pixels is (an edge point in the difference picture) and (an edge point in the current frame) but not (an edge point in the previous frame), and
    b. the second predetermined neighborhood pixel is either:
      1. (an edge point in the difference picture) and (an edge point in the current frame) but not (an edge point in the previous frame), or
      2. (an edge point in the difference picture) and (an edge point in the current frame) and (an edge point in the previous frame);

(5) said feature extraction logic decrementing said first counter and said second counter responsive to:
  (i) the k-bit label corresponding to the predetermined pixel indicating that the predetermined pixel is (an edge point in the difference picture) and (an edge point in the current frame) and (an edge point in the previous frame), and
  (ii) the k-bit labels corresponding to the predetermined neighborhood pixels indicating that:
    (a. the first predetermined neighborhood pixels is (an edge point in the difference picture) and (an edge point in the current frame) and (an edge point in the previous frame), or
    b. either the first or third predetermined neighborhood pixels is (an edge point in the difference picture) and (an edge point in the current frame) and (an edge point in the previous frame)), and
    c. the second predetermined neighborhood pixel is (an edge point in the difference picture) and (an edge point in the current frame) and (an edge point in the previous frame).

14. The circuit architecture for dynamic scene analysis according to any of claims 2, 4, 6, or 8:
  (1) said feature extraction logic causing said second counter to count in a second direction responsive to:
    (i) the k-bit label corresponding to the predetermined pixel indicating that the predetermined pixel is (an edge point in the difference picture) and (an edge point in the previous frame) but not (an edge point in the current frame), and
    (ii) the k-bit labels corresponding to the predetermined neighborhood pixels indicating that:
      a. at least one of the first and third predetermined neighborhood pixels is either:
        1. (an edge point in the difference picture) and (an edge point in the previous frame) but not (an edge point in the current frame), or
        2. (an edge point in the difference picture) and (an edge point in the current frame) and (an edge point in the previous frame), and
      b. the second predetermined neighborhood pixel is either:
        1. (an edge point in the difference picture) and (an edge point in the previous frame) but not (an edge point in the current frame), or
        2. (an edge point in the difference picture) and (an edge point in the current frame) and (an edge point in the previous frame);
  (2) said feature extraction logic causing said first counter to count in a second direction responsive to:
    (i) the k-bit label corresponding to the predetermined pixel indicating that the predetermined pixel is (an edge point in the difference picture) and (an edge point in the current frame) but not (an edge point in the previous frame), and
    (ii) the k-bit labels corresponding to the predetermined neighborhood pixels indicating that:
      a. at least one of the first and third predetermined neighborhood pixels is either:
        1. (an edge point in the difference picture) and (an edge point in the current frame) but not (an edge point in the previous frame), or
        2. (an edge point in the difference picture) and (an edge point in the current frame) and (an edge point in the previous frame), and
      b. the second predetermined neighborhood pixel is either:
        1. (an edge point in the difference picture) and (an edge point in the current frame) but not (an edge point in the previous frame), or
        2. (an edge point in the difference picture) and (an edge point in the current frame) and (an edge point in the previous frame);
  (3) said feature extraction logic causing said second counter to count in the second direction responsive to:
    (i) the k-bit label corresponding to the predetermined pixel indicating that the predetermined pixel is (an edge point in the difference picture) and (an edge point in the previous frame) and (an edge point in the current frame), and
    (ii) the k-bit labels corresponding to the predetermined neighborhood pixels indicating that:
      a. at least one of the first and third predetermined neighborhood pixels is either:
        1. (an edge point in the difference picture) and (an edge point in the previous frame) but not (an edge point in the current frame), or
        2. (an edge point in the difference picture) and (an edge point in the current frame) and (an edge point in the previous frame), and b. the second predetermined neighborhood pixel is (an edge point in the difference picture) and (an edge point in the previous frame) but not (an edge point in the current frame);

(3') said feature extraction logic causing said second counter to count in the second direction responsive to:
 (i) the k-bit label corresponding to the predetermined pixel indicating that the predetermined pixel is (an edge point in the difference picture) and (an edge point in the previous frame) and (an edge point in the current frame), and
 (ii) the k-bit labels corresponding to the predetermined neighborhood pixels indicating that:
  a. at least one of the first and third predetermined neighborhood pixels is (an edge point in the difference picture) and (an edge point in the previous frame) but not (an edge point in the current frame), and
  b. the second predetermined neighborhood pixel is either:
   1. (an edge point in the difference picture) and (an edge point in the previous frame) but not (an edge point in the current frame), or
   2. (an edge point in the difference picture) and (an edge point in the current frame) and (an edge point in the previous frame);

(4) said feature extraction logic causing said first counter to count in the second direction responsive to:
 (i) the k-bit label corresponding to the predetermined pixel indicating that the predetermined pixel is (an edge point in the difference picture) and (an edge point in the current frame) and (an edge point in the previous frame), and
 (ii) the k-bit labels corresponding to the predetermined neighborhood pixels indicating that:
  a. at least one of the first and third predetermined neighborhood pixels is either:
   1. (an edge point in the difference picture) and (an edge point in the current frame) but not (an edge point in the previous frame), or
   2. (an edge point in the difference picture) and (an edge point in the current frame) and (an edge point in the previous frame), and
  b. the second predetermined neighborhood pixel is (an edge point in the difference picture) and (an edge point in the current frame) but not (an edge point in the previous frame);

(4') said feature extraction logic causing said first counter to count in the second direction responsive to:
 (i) the k-bit label corresponding to the predetermined pixel indicating that the predetermined pixel is (an edge point in the difference picture) and (an edge point in the current frame) and (an edge point in the previous frame), and
 (ii) the k-bit labels corresponding to the predetermined neighborhood pixels indicating that:
  a. at least one of the first and third predetermined neighborhood pixels is (an edge point in the difference picture) and (an edge point in the current frame) but not (an edge point in the previous frame), and
  b. the second predetermined neighborhood pixel is either:
   1. (an edge point in the difference picture) and (an edge point in the current frame) but not (an edge point in the previous frame), or
   2. (an edge point in the difference picture) and (an edge point in the current frame) and (an edge point in the previous frame);

(5) said feature extraction logic causing said first counter and said second counter to count in the second direction responsive to:
 (i) the k-bit label corresponding to the predetermined pixel indicating that the predetermined pixel is (an edge point in the difference picture) and (an edge point in the current frame) and (an edge point in the previous frame), and
 (ii) the k-bit labels corresponding to the predetermined neighborhood pixels indicating that:
  (a. the first predetermined neighborhood pixels is (an edge point in the difference picture) and (an edge point in the current frame) and (an edge point in the previous frame), or
  b. either the first or third predetermined neighborhood pixels is (an edge point in the difference picture) and (an edge point in the current frame) and (an edge point in the previous frame)), and
  c. the second predetermined neighborhood pixel is (an edge point in the difference picture) and (an edge point in the current frame) and (an edge point in the previous frame).

15. The circuit architecture for dynamic scene analysis according to claim 11:
 (1) said feature extraction logic decrementing said second counter responsive to:
  (i) the k-bit label corresponding to the predetermined pixel indicating that the predetermined pixel is (an edge point in the difference picture) and (an edge point in the previous frame) but not (an edge point in the current frame), and
  (ii) the k-bit labels corresponding to the predetermined neighborhood pixels indicating that:
   a. at least one of the first and third predetermined neighborhood pixels is either:
    1. (an edge point in the difference picture) and (an edge point in the previous frame) but not (an edge point in the current frame), or
    2. (an edge point in the difference picture) and (an edge point in the current frame) and (an edge point in the previous frame), and
   b. the second predetermined neighborhood pixel is either:
    1. (an edge point in the difference picture) and (an edge point in the previous frame) but not (an edge point in the current frame), or
    2. (an edge point in the difference picture) and (an edge point in the current frame) and (an edge point in the previous frame);
 (2) said feature extraction logic decrementing said first counter responsive to:
  (i) the k-bit label corresponding to the predetermined pixel indicating that the predetermined pixel is (an edge point in the difference picture) and (an edge point in the current frame) but not (an edge point in the previous frame), and
  (ii) the k-bit labels corresponding to the predetermined neighborhood pixels indicating that:
   a. at least one of the first and third predetermined neighborhood pixels is either:
    1. (an edge point in the difference picture) and (an edge point in the current frame) but not (an edge point in the previous frame), or
    2. (an edge point in the difference picture) and (an edge point in the current frame) and (an edge point in the previous frame), and
   b. the second predetermined neighborhood pixel is either:

1. (an edge point in the difference picture) and (an edge point in the current frame) but not (an edge point in the previous frame), or
2. (an edge point in the difference picture) and (an edge point in the current frame) and (an edge point in the previous frame);

(3) said feature extraction logic decrementing said second counter responsive to:
  (i) the k-bit label corresponding to the predetermined pixel indicating that the predetermined pixel is (an edge point in the difference picture) and (an edge point in the previous frame) and (an edge point in the current frame), and
  (ii) the k-bit labels corresponding to the predetermined neighborhood pixels indicating that:
    a. at least one of the first and third predetermined neighborhood pixels is either:
      1. (an edge point in the difference picture) and (an edge point in the previous frame) but not (an edge point in the current frame), or
      2. (an edge point in the difference picture) and (an edge point in the current frame) and (an edge point in the previous frame), and
    b. the second predetermined neighborhood pixel is (an edge point in the difference picture) and (an edge point in the previous frame) but not (an edge point in the current frame);

(3') said feature extraction logic decrementing said second counter responsive to:
  (i) the k-bit label corresponding to the predetermined pixel indicating that the predetermined pixel is (an edge point in the difference picture) and (an edge point in the previous frame) and (an edge point in the current frame), and
  (ii) the k-bit labels corresponding to the predetermined neighborhood pixels indicating that:
    a. at least one of the first and third predetermined neighborhood pixels is (an edge point in the difference picture) and (an edge point in the previous frame) but not (an edge point in the current frame), and
    b. the second predetermined neighborhood pixel is either:
      1. (an edge point in the difference picture) and (an edge point in the previous frame) but not (an edge point in the current frame), or
      2. (an edge point in the difference picture) and (an edge point in the current frame) and (an edge point in the previous frame);

(4) said feature extraction logic decrementing said first counter responsive to:
  (i) the k-bit label corresponding to the predetermined pixel indicating that the predetermined pixel is (an edge point in the difference picture) and (an edge point in the current frame) and (an edge point in the previous frame), and
  (ii) the k-bit labels corresponding to the predetermined neighborhood pixels indicating that:
    a. at least one of the first and third predetermined neighborhood pixels is either:
      1. (an edge point in the difference picture) and (an edge point in the current frame) but not (an edge point in the previous frame), or
      2. (an edge point in the difference picture) and (an edge point in the current frame) and (an edge point in the previous frame), and
    b. the second predetermined neighborhood pixel is (an edge point in the difference picture) and (an edge point in the current frame) but not (an edge point in the previous frame);

(4') said feature extraction logic decrementing said first counter responsive to:
  (i) the k-bit label corresponding to the predetermined pixel indicating that the predetermined pixel is (an edge point in the difference picture) and (an edge point in the current frame) and (an edge point in the previous frame), and
  (ii) the k-bit labels corresponding to the predetermined neighborhood pixels indicating that:
    a. at least one of the first and third predetermined neighborhood pixels is (an edge point in the difference picture) and (an edge point in the current frame) but not (an edge point in the previous frame), and
    b. the second predetermined neighborhood pixel is either:
      1. (an edge point in the difference picture) and (an edge point in the current frame) but not (an edge point in the previous frame), or
      2. (an edge point in the difference picture) and (an edge point in the current frame) and (an edge point in the previous frame);

(5) said feature extraction logic decrementing said first counter and said second counter responsive to:
  (i) the k-bit label corresponding to the predetermined pixel indicating that the predetermined pixel is (an edge point in the difference picture) and (an edge point in the current frame) and (an edge point in the previous frame), and
  (ii) the k-bit labels corresponding to the predetermined neighborhood pixels indicating that:
    (a. the first predetermined neighborhood pixels is (an edge point in the difference picture) and (an edge point in the current frame) and (an edge point in the previous frame), or
    b. either the first or third predetermined neighborhood pixels is (an edge point in the difference picture) and (an edge point in the current frame) and (an edge point in the previous frame)), and
    c. the second predetermined neighborhood pixel is (an edge point in the difference picture) and (an edge point in the current frame) and (an edge point in the previous frame).

16. The circuit architecture for dynamic scene analysis according to claim 12:
  (1) said feature extraction logic causing said second counter to count in a second direction responsive to:
    (i) the k-bit label corresponding to the predetermined pixel indicating that the predetermined pixel is (an edge point in the difference picture) and (an edge point in the previous frame) but not (an edge point in the current frame), and
    (ii) the k-bit labels corresponding to the predetermined neighborhood pixels indicating that:
      a. at least one of the first and third predetermined neighborhood pixels is either:
        1. (an edge point in the difference picture) and (an edge point in the previous frame) but not (an edge point in the current frame), or
        2. (an edge point in the difference picture) and (an edge point in the current frame) and (an edge point in the previous frame), and
      b. the second predetermined neighborhood pixel is either:
        1. (an edge point in the difference picture) and (an edge point in the previous frame) but not (an edge point in the current frame), or 2. (an edge point in the difference picture) and (an edge point in the current frame) and (an edge point in the previous frame);

(2) said feature extraction logic causing said first counter to count in a second direction responsive to:
  (i) the k-bit label corresponding to the predetermined pixel indicating that the predetermined pixel is (an edge point in the difference picture) and (an edge point in the current frame) but not (an edge point in the previous frame), and
  (ii) the k-bit labels corresponding to the predetermined neighborhood pixels indicating that:
    a. at least one of the first and third predetermined neighborhood pixels is either:
      1. (an edge point in the difference picture) and (an edge point in the current frame) but not (an edge point in the previous frame), or
      2. (an edge point in the difference picture) and (an edge point in the current frame) and (an edge point in the previous frame), and
    b. the second predetermined neighborhood pixel is either:
      1. (an edge point in the difference picture) and (an edge point in the current frame) but not (an edge point in the previous frame), or
      2. (an edge point in the difference picture) and (an edge point in the current frame) and (an edge point in the previous frame);

(3) said feature extraction logic causing said second counter to count in the second direction responsive to:
  (i) the k-bit label corresponding to the predetermined pixel indicating that the predetermined pixel is (an edge point in the difference picture) and (an edge point in the previous frame) and (an edge point in the current frame), and
  (ii) the k-bit labels corresponding to the predetermined neighborhood pixels indicating that:
    a. at least one of the first and third predetermined neighborhood pixels is either:
      1. (an edge point in the difference picture) and (an edge point in the previous frame) but not (an edge point in the current frame), or
      2. (an edge point in the difference picture) and (an edge point in the current frame) and (an edge point in the previous frame), and
    b. the second predetermined neighborhood pixel is (an edge point in the difference picture) and (an edge point in the previous frame) but not (an edge point in the current frame);

(3') said feature extraction logic causing said second counter to count in the second direction responsive to:
  (i) the k-bit label corresponding to the predetermined pixel indicating that the predetermined pixel is (an edge point in the difference picture) and (an edge point in the previous frame) and (an edge point in the current frame), and
  (ii) the k-bit labels corresponding to the predetermined neighborhood pixels indicating that:
    a. at least one of the first and third predetermined neighborhood pixels is (an edge point in the difference picture) and (an edge point in the previous frame) but not (an edge point in the current frame), and
    b. the second predetermined neighborhood pixel is either:
      1. (an edge point in the difference picture) and (an edge point in the previous frame) but not (an edge point in the current frame), or
      2. (an edge point in the difference picture) and (an edge point in the current frame) and (an edge point in the previous frame);

(4) said feature extraction logic causing said first counter to count in the second direction responsive to:
  (i) the k-bit label corresponding to the predetermined pixel indicating that the predetermined pixel is (an edge point in the difference picture) and (an edge point in the current frame) and (an edge point in the previous frame), and
  (ii) the k-bit labels corresponding to the predetermined neighborhood pixels indicating that:
    a. at least one of the first and third predetermined neighborhood pixels is either:
      1. (an edge point in the difference picture) and (an edge point in the current frame) but not (an edge point in the previous frame), or
      2. (an edge point in the difference picture) and (an edge point in the current frame) and (an edge point in the previous frame), and
    b. the second predetermined neighborhood pixel is (an edge point in the difference picture) and (an edge point in the current frame) but not (an edge point in the previous frame);

(4') said feature extraction logic causing said first counter to count in the second direction responsive to:
  (i) the k-bit label corresponding to the predetermined pixel indicating that the predetermined pixel is (an edge point in the difference picture) and (an edge point in the current frame) and (an edge point in the previous frame), and
  (ii) the k-bit labels corresponding to the predetermined neighborhood pixels indicating that:
    a. at least one of the first and third predetermined neighborhood pixels is (an edge point in the difference picture) and (an edge point in the current frame) but not (an edge point in the previous frame), and
    b. the second predetermined neighborhood pixel is either:
      1. (an edge point in the difference picture) and (an edge point in the current frame) but not (an edge point in the previous frame), or
      2. (an edge point in the difference picture) and (an edge point in the current frame) and (an edge point in the previous frame);

(5) said feature extraction logic causing said first counter and said second counter to count in the second direction responsive to:
  (i) the k-bit label corresponding to the predetermined pixel indicating that the predetermined pixel is (an edge point in the difference picture) and (an edge point in the current frame) and (an edge point in the previous frame), and
  (ii) the k-bit labels corresponding to the predetermined neighborhood pixels indicating that:
    (a. the first predetermined neighborhood pixels is (an edge point in the difference picture) and (an edge point in the current frame) and (an edge point in the previous frame), or
    b. either the first or third predetermined neighborhood pixels is (an edge point in the difference picture) and (an edge point in the current frame) and (an edge point in the previous frame)), and
    c. the second predetermined neighborhood pixel is (an edge point in the difference picture) and (an edge point in the current frame) and (an edge point in the previous frame).

17. The circuit architecture for dynamic scene analysis according to any of claims 1, 3, 5, or 7, wherein the scene has associated therewith a matrix of pixels, said matrix of pixels having m rows and n columns and wherein said line delay comprises n+2 3-bit registers connected in circuit communication.

18. The circuit architecture for dynamic scene analysis according to any of claims 2, 4, 6, or 8, wherein the scene has associated therewith a matrix of pixels, said matrix of pixels having m rows and n columns and wherein said line delay comprises n+2 3-bit registers connected in circuit communication.

19. The circuit architecture for dynamic scene analysis according to claim 11 wherein the scene has associated therewith a matrix of pixels, said matrix of pixels having m rows and n columns and wherein said line delay comprises n+2 3-bit registers connected in circuit communication.

20. The circuit architecture for dynamic scene analysis according to claim 15 wherein the scene has associated therewith a matrix of pixels, said matrix of pixels having m rows and n columns and wherein said line delay comprises n+2 3-bit registers connected in circuit communication.

21. The circuit architecture for dynamic scene analysis according to any of claims 1, 3, 5, or 7, wherein each of said adjacency logic units comprises at least one decoder for decoding the coded labels.

22. The circuit architecture for dynamic scene analysis according to any of claims 2, 4, 6, or 8, wherein each of said adjacency logic units comprises at least one decoder for decoding the coded labels.

23. The circuit architecture for dynamic scene analysis according to claim 11 wherein each of said adjacency logic units comprises at least one decoder for decoding the coded labels.

24. The circuit architecture for dynamic scene analysis according to claim 15 wherein each of said adjacency logic units comprises at least one decoder for decoding the coded labels.

25. The circuit architecture for dynamic scene analysis according to claim 17 wherein each of said adjacency logic units comprises at least one decoder for decoding the coded labels.

\* \* \* \* \*